(12) United States Patent
Manukyan

(10) Patent No.: US 6,687,733 B2
(45) Date of Patent: Feb. 3, 2004

(54) METHOD AND SYSTEM FOR AUTOMATICALLY CONFIGURING A CLIENT-SERVER NETWORK

(75) Inventor: Jacques A. Manukyan, Paramus, NJ (US)

(73) Assignee: Intergenix, Paramus, NJ (US)

( * ) Notice: Subject to any disclaimer, the term of this patent is extended or adjusted under 35 U.S.C. 154(b) by 272 days.

(21) Appl. No.: 09/872,876

(22) Filed: Jun. 1, 2001

(65) Prior Publication Data

US 2002/0184349 A1 Dec. 5, 2002

(51) Int. Cl.$^7$ ................................................ G06F 15/16
(52) U.S. Cl. ........................................................ 709/200
(58) Field of Search ............................... 709/202, 205, 709/230, 200

(56) References Cited

U.S. PATENT DOCUMENTS

| | | | |
|---|---|---|---|
| 5,341,477 A | | 8/1994 | Pitkin et al. ................. 709/226 |
| 5,426,421 A | | 6/1995 | Gray ........................... 709/223 |
| 5,515,508 A | | 5/1996 | Pettus et al. ................. 709/203 |
| 5,644,720 A | | 7/1997 | Boll et al. .................... 709/227 |
| 5,673,322 A | * | 9/1997 | Pepe et al. .................... 380/49 |
| 5,748,896 A | | 5/1998 | Daly et al. ................... 703/223 |
| 5,761,286 A | * | 6/1998 | Das et al. ..................... 379/127 |
| 5,926,631 A | | 7/1999 | Mcgarvey ...................... 703/23 |
| 5,931,928 A | * | 8/1999 | Brennan et al. ................ 710/68 |
| 5,980,078 A | * | 11/1999 | Krivoshein et al. ......... 364/131 |
| 5,995,756 A | | 11/1999 | Herrmann ..................... 717/178 |
| 6,009,103 A | * | 12/1999 | Woundy ....................... 370/401 |
| 6,012,088 A | * | 1/2000 | Li et al. ....................... 709/219 |
| 6,085,030 A | | 7/2000 | Whitehead et al. ........... 709/203 |
| 6,105,063 A | | 8/2000 | Hayes, Jr. ..................... 709/223 |
| 6,144,959 A | | 11/2000 | Anderson et al. ................ 707/9 |
| 6,170,017 B1 | | 1/2001 | Dias et al. .................... 709/235 |
| 6,199,111 B1 | | 3/2001 | Hara et al. ................... 709/227 |

OTHER PUBLICATIONS

Gunter M, et al, "An Architecture for Managing QoS–enabled UPNs over the Internet", Local Computer Networks, 1999, pp. 122–131.

Chipalkatti, R, et al, "A Prototype of a Service Management System for the Intelligent Network", Global Telecommunications Confrence, 1993, pp. 1931–1937.

* cited by examiner

Primary Examiner—David Y. Eng
(74) Attorney, Agent, or Firm—Carella, Byrne,et al.; G. Glennon Troublefield

(57) ABSTRACT

A system for automatically configuring server daemons in a client-server network for delivering services to a client is provided. The system comprises an interactive server in communication with a database server. The interactive server runs a server daemon to make a service available to a client. The server daemon is programmed to automatically locate, configure and edit predetermined system configuration files located in the interactive server, relative to account information associated with the client. The database server releasably retains the account information, and has a task program to generate executable and transferable tasks for use in configuring the predetermined system files. The client communicates with the interactive server through an external communications switch using a controller. The controller enables the client to selectably add, remove, or modify the services available from the server daemon by manipulating the account information.

41 Claims, 8 Drawing Sheets

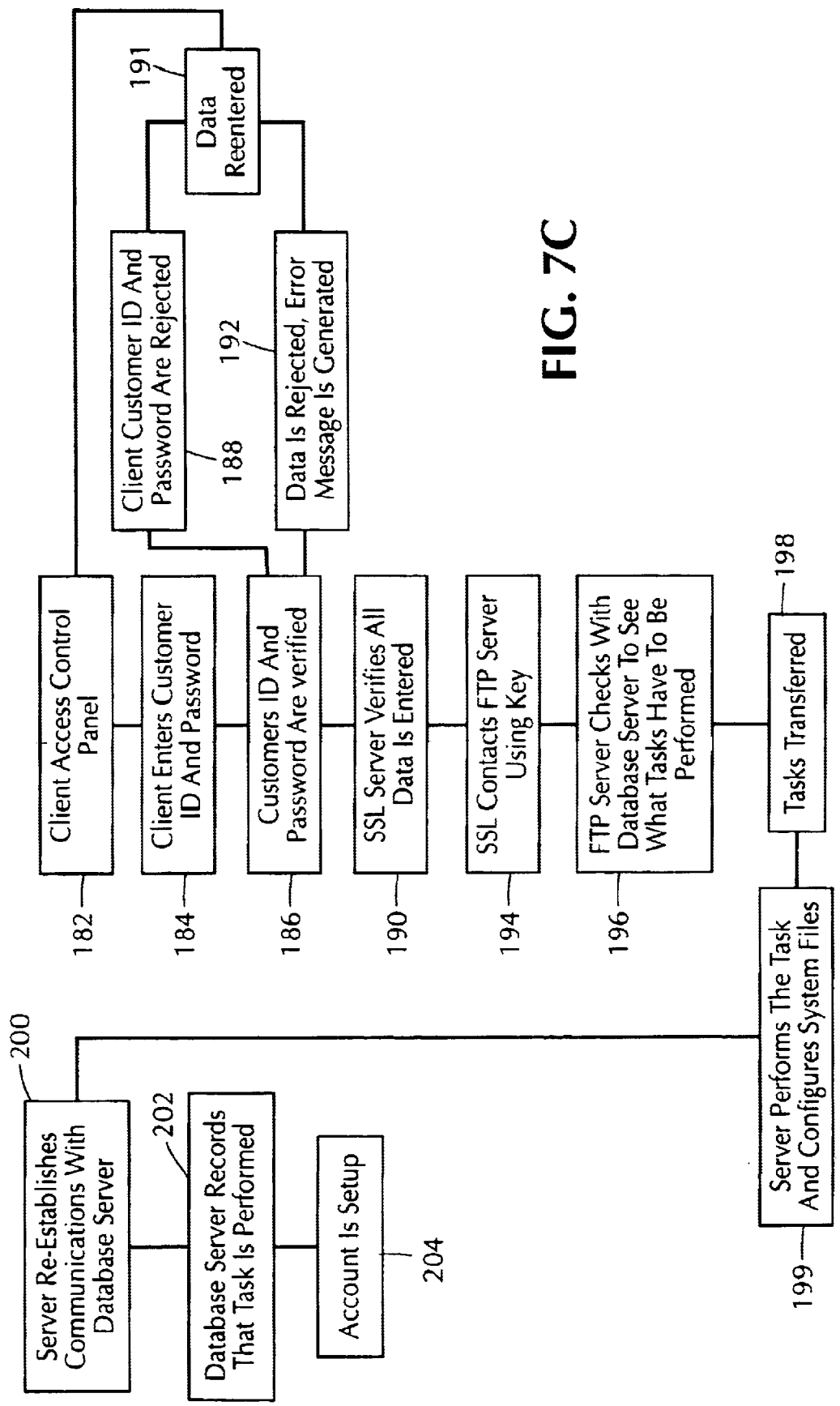

METHOD AND SYSTEM FOR AUTOMATICALLY CONFIGURING A CLIENT-SERVER NETWORK

FIELD OF THE INVENTION

The present invention relates to computer systems for network services. In particular, the invention relates to a method and system for use in configuring network servers for making services available to a client.

BACKGROUND OF THE INVENTION

The growth of the Internet® and the World Wide Web (also known as the "Web") has spawned an explosion of online services. The accessibility of the Internet® to end-users and clients (i.e., end-user programs and applications) has opened the door to a vast array of web-based services and applications offered by hosting companies. Typically, hosting companies make available or sell to clients services or applications that provide Internet based services, such as web space for a web site, email, and the like. The client, in turn, may offer those services to end users (which may also be considered clients). The services that are made available and sold by hosting companies are maintained on computer interfaces commonly known as "servers". Servers are computers or hardware on which the services that clients use reside. Services available on the servers are transmitted from the server software to the client software over communication lines in The frenetic pace of computer innovation has increased the need for hosting companies to provide services that are quickly accessible and have enhanced performance. For instance, many end users utilize the Web to transact business, order supplies, and exchange information. As a result, hosting companies are under increased pressure to deliver hosting services to clients that are more accessible, problem free and match the rapid pace in which services are utilized by the end-users or customers of the client. Nonetheless, hosting companies often experience a multitude of problems in delivering hosting services to clients that offer web based services to end-users.

Many of the problems experienced by hosting companies are caused by features of the client's account not working properly or errors on the part of the hosting company in setting-up the account. Typically, a client may set-up an account by telephoning a sales representative of the hosting company to request a particular account or service. The sales representative will then take all of the information from the client (such as the name, address, and billing information) and pass that information to a system administrator who is in charge of actually setting-up the account for the client. Setting-up the account requires a series of tasks in configuring system files of the server(s) according to attributes or settings that are desired by the client when the account is used. If the system administrator enters data incorrectly, the account will not function according to the client's desire. Therefore, the client cannot use the account as desired until the errors are corrected.

A disadvantage in setting up client accounts is the amount of time that is necessary to configure the server's system or configuration files to the proper settings. Depending upon how complex the server(s) of the hosting company are, the process of setting-up an account for each of the hundreds of thousands of end users that may access the hosting company's servers, may take hours, or up to a few weeks to completely set-up each client's account. The delays in setting-up an account increases exponentially as more and more clients request services from the hosting company.

Even the advent of online applications has not made the task of setting-up an account error free. Online applications typically require the client to enter account information by answering a series of questions that are posted on the web page. Based upon the information entered, the attributes of the account are setup by the system administrator of the hosting company by modifying the system files of the server accordingly. However, problems typically arise when the client's account is not setup according to the client's desires. For example, if the client notices that the account is not working properly, a technical support representative of the hosting company will have to be contacted to fix the problem. Nonetheless, in order to fix the problem, the technical support representative must contact the system administrator who, as a general rule, does not speak with the client directly, but is in charge of correcting errors of the client's account. Therefore, the speed in which the problem can be fixed rests solely on the shoulders of the technical support representative to not only describe what the problem is but also to explain what the client ultimately desires. Of course, with all of these multiple levels of communication, the room for human error increases. As a result, delays in adjusting an account to suit the needs of a client often arise. These delays directly impact upon the ability of the hosting company to deliver and offer its hosting services for sale, in the highly competitive world of computer technology.

As an additional problem, prior art client-server architecture commercially available today from hosting companies typically use one server to provide all of the services that are available to the client. In short, one server is used to run programs such as email, login requirements, web-page management, email management, and the like. Each of the services running on the server relies upon a central repository of memory located within the server to store the attributes of the client's account. However, as the number of clients that are assigned to a particular server increases, delays in the hosting company's ability to offer the hosting services used by the end users and/or clients often arise. Delays of this sort are caused by too many clients or end-users of a client requesting hosting services at or about the same time, which causes the server to operate near full capacity. To overcome these problems, many hosting companies will limit the number of clients that are assigned to a particular server, frequently utilizing only about half of the server's capacity. When new clients are added, the hosting company will use a new server to offer the identical array of hosting services that are offered by existing servers. Nonetheless, the process of adding new servers becomes expensive, particularly in view of the fact that each server is not used to capacity. This is an inefficient way to provide services. Moreover, no matter how many servers are added in accordance with the current practice of the industry, each server will experience the same delays in offering hosting services when the capacity of the server is reached.

To overcome the problems and disadvantages described above, it is desired to provide an automated system and method for configuring servers for use in delivering hosting services to a client. It is further desired to provide a controller for use by a client, to automate the task of creating, maintaining, and deleting services offered by hosting companies for use by end-users. It is also desired to provide an automated client-server system that increases the speed in which services to a client are delivered and permits flexibility in connecting servers from different hosting companies or vendors, to provide the services offered to the client.

BRIEF DESCRIPTION OF THE INVENTION

The present invention relates to a system for automatically configuring servers in a client-server network for delivering services to a client. The system comprises an interactive server to selectably contact a database server, through an internal communications switch. The interactive server has a server daemon to make a service available to a client. The server daemon is programmed to automatically locate, configure and edit predetermined system configuration files located in the interactive server, relative to account information associated with the client. The database server releasably retains the account information and has a task program to generate executable and transferable tasks for use in configuring the predetermined system configuration files. The client communicates with the interactive server through an external communications switch, which enables the client to access the service available from the server daemon.

In operation, the interactive server contacts the database server to access the tasks so that the predetermined system configuration files may be automatically configured to setup, add or modify the service available to the client as desired.

In a preferred embodiment, the system further comprises a controller to enable the client to communicate with the interactive server to add, modify or change the service available to the claim, by manipulating the account information.

BRIEF DESCRIPTION OF THE DRAWINGS

For the purpose of illustrating the invention, there is shown in the drawings a form of which is presently preferred; it being understood, however, that this invention is not limited to the precise arrangements and instrumentalities shown.

FIGS. 7A to 7C are flow diagrams exemplifying the operation of the server system of the present invention.

DETAILED DESCRIPTION OF THE INVENTION

Figure 1:
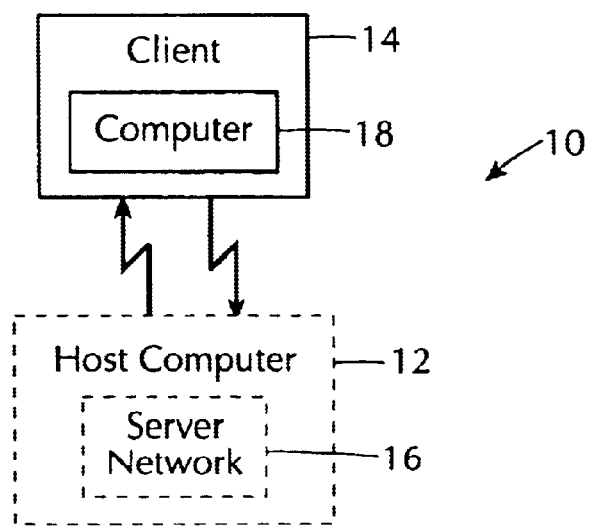
FIG. 1 is a block diagram of a client-server system in accordance with a preferred embodiment of the present invention.

The present invention will now be described more fully herein, with reference to the accompanying drawings, in which preferred embodiments of the invention are shown. This invention may, however, be embodied in many different forms and should not be construed as limited to the embodiment set forth herein; rather, the embodiment shown in the drawings are provided to illustrate the basic structure and components of the invention, as would be understood by those of ordinary skill in the art. As shown in the drawings, use of the broken lines illustrates that the components of the invention are not limited to a particular size, structure or location.

A. Definitions

As used in this specification and the appended claims:

a. the term "client" means a program or application that issues and transmits commands and requests from a work station (such as a computer) that is being used by an individual or entity to access, utilize, and/or provide services from a host company (host). As used herein, the client purchases services or applications from the host to access, utilize and/or provide services, such as web pages, email, and the like to end users or other clients. The services that are purchased by the client from the host are part of the client's "account".

b. the term "server" means any source having a program or an application that responds to requests and commands from a client and performs the tasks associated with the commands. The server as used herein may be a computer that includes a central processing unit, memory, a sequencing unit, and circuitry for handling input and output (I/O) operations for storing and fetching data stored in memory. The server also includes an operating system (such as Unix and Linux systems) for use in running application software and programs to provide a particular service. It is contemplated that a server may be a computer program, web site or other source for making available and/or delivering services to the client.

c. the term "HyperText Markup Language" (HTML) means the language used by servers that is accessible from the World Wide Web and Internet to create and connect Hypertext documents that are viewed by clients on a display (such as a monitor) as web pages. The Hypertext documents may also be assembled in a language known as the Extensible Markup Language (XML).

d. the term "web server" is used interchangeably to describe the dedicated computer maintained by hosting companies on which web pages reside and the program on that computer that receives network requests and transmits HTML and other web based files.

e. the term "Hypertext Transfer Protocol" (HTTP) means a protocol used by the World Wide Web to transfer data between computers, such as allowing a client to request and receive access to web pages.

f. the term "common gateway interface" (CGI) means a mechanism by which a client using the World Wide Web can request the execution of a program on a web site that runs the CGI program and sends the output of that program to the client. The term "gateway" means a mechanism, such as a program or machine, by which a computer can automatically transmit packets from one network to another.

g. the term "packet(s)" describe the compact pieces of data and information that travels over the Internet®. Packets are divided up and reassembled according to the Transmission Control Protocol/Internet Protocol (TCP/IP), User Datagram Protocol/Internet Protocol (UDP/IP) or other defined protocol. TCP/IP and UDP/IP are a collection of protocols that divides data into packets and routes the packets through a network to their final destination. Data may be any alphanumeric text or electronic communication, such as video and audio communications.

h. the term "Internet®" means an internetwork of computer networks, which has existed in some form since the early 1970s and is based on the TCP/IP and UDP/IP Protocols.

i. the term "network" means a collection of computers that are logically connected together to exchange data and information, such as a local area network (LAN), a wide area network (WAN), an intranet, and an internetwork, such as the Internet®.

j. the term "World Wide Web" (the Web) means a collection of hypertext documents maintained by a web server that are available through the Internet®. A hypertext document may contain hyperlinks to other documents, which a person or client can use to navigate from document to document.

k. the terms "configuring", "configure" or "configuration" describe the process of setting-up, creating, deleting, adding, and modifying computer source code and object code associated with a program or system files on a server to provide services to a client.

l. the term "operating system" means the low-level software which handles the interface to peripheral hardware, generates schedules, performs tasks, allocates storage, and executes application software. An operating system has predetermined system files, such as configuration files to configure the hardware and application software to provide a certain operation or to perform a certain task. The operating system also presents a default interface to the user when no application is running.

m. the term "daemon" means a software application program that is not invoked explicitly, but lies dormant waiting for some conditions to occur, such as receiving instructions from a source external to it. Daemons are usually spawned automatically to grant access to services available from the server. Daemons may exist forever, regenerate at internals, or regenerate when a connection is made.

n. the term "end-user" means the person or entity who uses a computer application, as opposed to those who develop or support it.

o. the terms "hosting company", "host company", and "host" mean a company which sells a service or application that will provide Internet based services or applications, such as web space for a web site, email, FTP and the like. The host typically maintains one or more servers that run programs or application software to provide services that are accessible through a network, such as the Internet® to provide what is commonly known as hosting services.

B. Architecture of the System of the Present Invention

Turning now to the drawings, where like numerals represent like elements, FIG. 1 shows an exemplary embodiment of an automated client-server network or system of the present invention, designated generally by the numeral 10. The system 10 automates the process of configuring server daemons and operating systems, which are used to make available and deliver to clients hosting services that may be utilized by end-users accessing a network, such as the Internet®. The system 10 comprises a host computer 12 having a server network 16 for delivering hosting services to a client 14. The client 14 has a computer 18 (See FIG. 2) for accessing services from the host 12. Although only one client 14 is shown, it should be understood that the system 10 may be used to make available hosting services to a plurality of different clients connected either individually to the system 10 or through a network, such as a LAN, WAN, an intranetwork, an internetwork, and the like.

Figure 2:
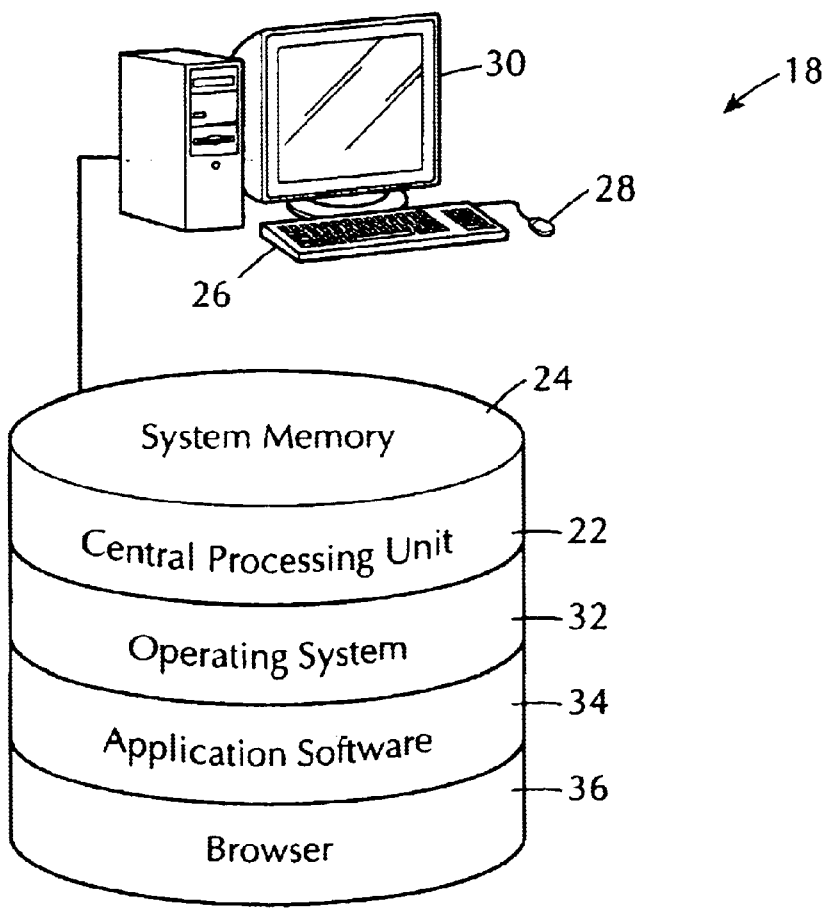
FIG. 2 is an exemplary computer for use by a client in the system of the present invention.

The computer 18 is connected to the host 12 through a two-way communications network or channel 20, such as a telecommunications line or wireless communication system (see FIG. 1). As shown in FIG. 2, the computer 18 has a central processing unit (CPU) 22, system memory 24, a data entry device (such as a key board) 26, a pointing device (e.g., a mouse, track ball, pen device, or the like) 28 and a display device 30 (such as a monitor) for displaying messages, text and other alphanumeric communications.

An operating system 32 is used to run application software 34 that is loaded into the computer 18 (i.e., transferred from storage into memory) for execution. Preferably, the operating system 32 includes a graphical network or user interface (GUI) application to enable the computer to communicate with the host 12 over the Web or Internet® using HTTP or other protocols. The graphical network interface has a web browser 36 for searching the Web, such as Netscape Navigator® and Microsoft® Internet Explorer®. The browser 36 enables the computer 18 to communicate with the host 12 via channel 20, using a dialup modem, cable line, digital service line, or other communications means to access the servers of the host company.

It should be understood that the client 14 may be an application or program running on any electrical device, having an operating system, data input device, a display, and system files for storing application software. Computer 18 is but one example of the different types of devices that may be utilized by the client 14. It is contemplated that any similar machine or device, such as a portable digital device, configured for Internet® or Web access and communication, may be used with the system 10.

Those skilled in the art will appreciate that the operation of the computer 18, the host 12, and the system 10, including the software and devices stored therein, begins with a supply of electricity from a source, such as an AC outlet, a battery, or other energy supply means. The flow of energy into the computer 18, as one example, energizes the components of the computer 18 and initializes the operating system 32 to execute the application software. Once the computer 18 is energized, it may be used to access the services provided by the host 12. Because the use of electronic devices such as computers are understood by those skilled in the art, further description is unnecessary.

The client 14 communicates with the host 12 through a sequence of requests and continuances. As used in this specification, the term "continuance" is a new request generated by the host 12 in response to a previous request generated and transmitted by the client 14. For example, when the client 14 transmits a request for service to the system 10, the host 12 receives the request and responds by generating one or more continuances in which a further response is solicited from the client 14. Thereafter, the client 14 selects the next request from the set of continuances generated and transmitted by the host 12. The swap of requests and continuances is how the client 14 exchanges information or "communicates" with the host 12.

In the preferred embodiment, the client 14 communicates with the host 12 by accessing the web page maintained by the hosting company. Access to the web page is gained when the client 14 enters a command at the graphical interface to search the Web using the browser 36, such as Netscape Navigator® or Internet Explorer®. The browser 36 will search the web for the appropriate hyperlink or address of the host company that is maintained on the host 12. The hyperlink includes the IP address or host name of the target host company assembled together using the appropriate Uniform Resource Locator (URL), such as http://www.hostname.com/service.html. The IP address is typically a string of numbers that are unique in a networking environment that identifies the particular host or server in the Internet® or Web. These numbers are assigned by central authorities called Regional Internet Registries, such as the American Registry for Internet Numbers (ARIN). However, because IP addresses may change, human readable names, also known as domain names, are used with web browsers. Domain names are stored by registrars, such as Network Solutions, that map the human readable names to the proper domain name server. The domain name servers map the domain name to the IP address. In the URL above, the "http" defines the protocol used to transfer information, such as HyperText Transfer Protocol (HTTP). Following the protocol is the name of the host company which is delineated in the URL by "//" on the left and "/" on the right. The host name is followed by the file name, which is to the right of the "/" at the end of the address. The "http" at the extreme left of the address refers to the HyperText Transfer Protocol which describes the protocol used for the exchange of requests and continuances, typically in packets.

After the client 14 enters the web address, the browser 36 stored within the computer 18 will navigate the client 14 through the Web to the matching web address. Once the web address is located, the browser 36 will generate a GET command, asking the server of the host 12 to connect the browser 36 to the hostname. To make the connection, the browser 36 translates the hostname into the IP Address, so that access to the services available from the host 12 can be gained. Access is gained when the host 12 sends the HTML and other files associated with the web site or page to the browser 36. The browser 36 receives the HTML and formats the same for display to the display device or monitor 30 of the client 14. At that point, the client 14 may generate, transmit, and exchange requests and continuances from the host 12 to use the services running on the server network 16 of the host 12.

Figure 3:
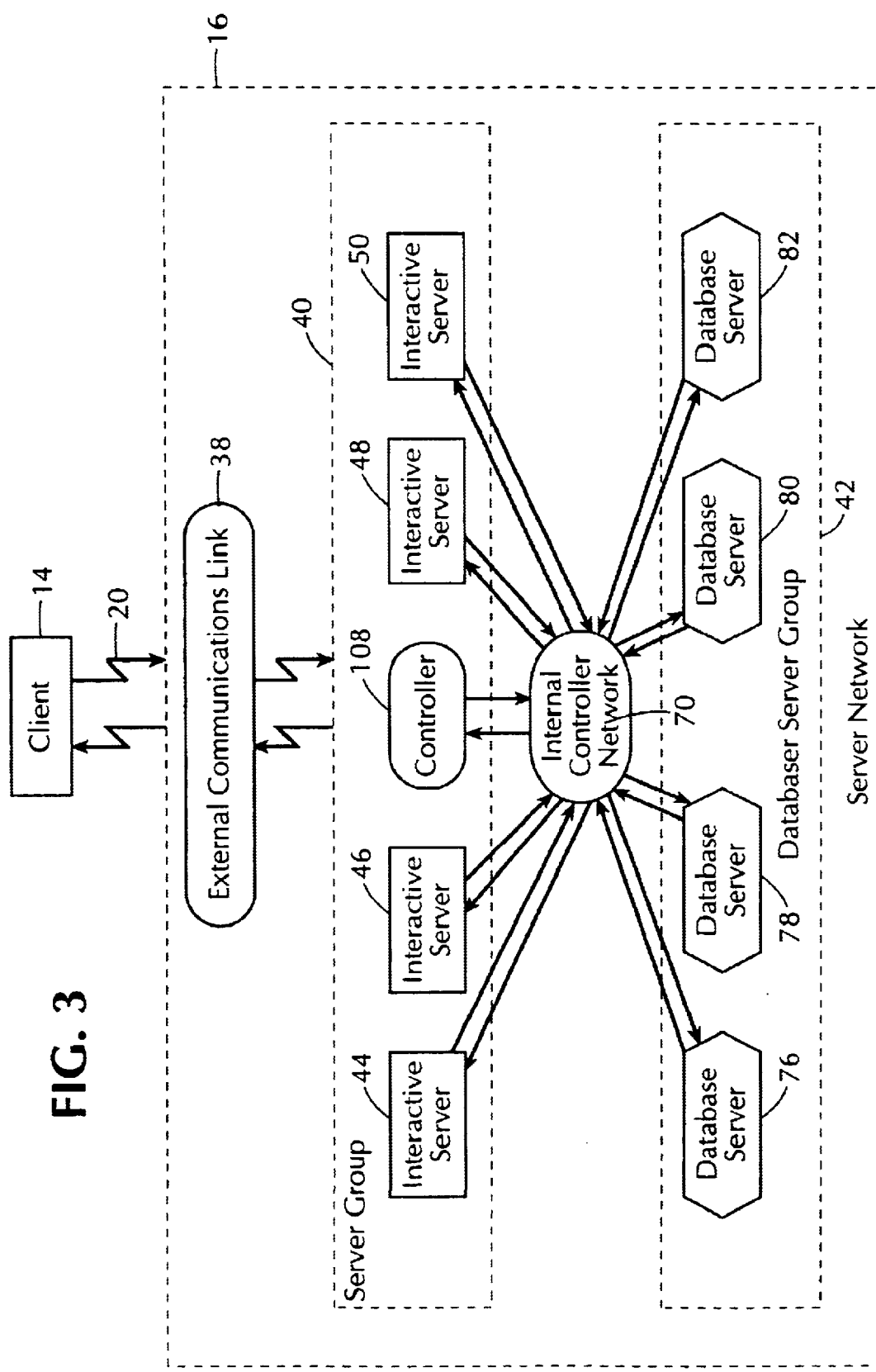
FIG. 3 is a block diagram of the system shown in FIG. 1, having a group of interactive servers in communication with a group of database servers for delivering services to the client.

FIG. 3 shows the overall architecture of the client-server system 10 as used in accordance with a preferred embodiment of the present invention. As shown, the client 14 is in communication with the server network 16 through channel 20. Channel 20 is connected to an external switch or network 38. Switch 38 enables the network 16 to establish a two-way communications channel or link with the client 14, using a compatible protocol such as HTTP. Switch 38 may be a special purpose machine or host known as a gateway that is configured to switch packets between the client 14 and the network 16. The switch 38 will enable the client 14 to access the services offered by the network 16 over a network, such as the Internet®. It should be understood that switch 38 may handle as few as one or any number of clients that may demand access to the network 16. For that reason, switch 38 is preferably a machine that can handle a large number of inbound and outbound communications, by routing requests and continuances to the proper designation.

The network 16 comprises a group of interactive servers 40 that interact and communicate with a group of external database servers 42. Server group 40 comprises a plurality of discrete, interactive servers (four shown) 44, 46, 48 and 50 to provide one or more predetermined application services to the client 14 that are part of the client's account. Although four servers are shown, it should be understood that as few as one or any number of discrete interactive servers may be used to define the group of servers 40. As used herein, it should be understood in keeping with the scope of the invention that the group of servers 40 means any number of interactive servers that are configured to provide a multitude of network based services to the client 14. It is contemplated that at least one interactive server or a series of interactive servers that are joined together may form the group 40. For example, a single server of the host 12 that provides one or more services on that server is considered a group of servers 40. It is also contemplated that the group of servers 40 may also be defined by a series of discrete servers from different host companies that are linked together through a network such as the Internet® or an Intranet to provide services for use with the account of the client 14.

Each server 44, 46, 48 and 50 are configured to make available at least one service or a series of services to the client 14, which may then be utilized by end-users. The services which may be provided by each server 44, 46, 48 and 50 may be selected from a group comprising web services, FTP services, mail services, log services, simple mail transfer (i.e., email) services, and the like. It should be understood that each server 44, 46, 48 and 50 may be programmed to run at least one or a series of predetermined services. Preferably, each server 44, 46, 48 and 50 offers different services as part of the group 40. Because each of the servers that define group 40 can provide the same services and share the same basic components, server 44 will be described as being representative of servers 44, 46, 48, and 50.

Figure 4:
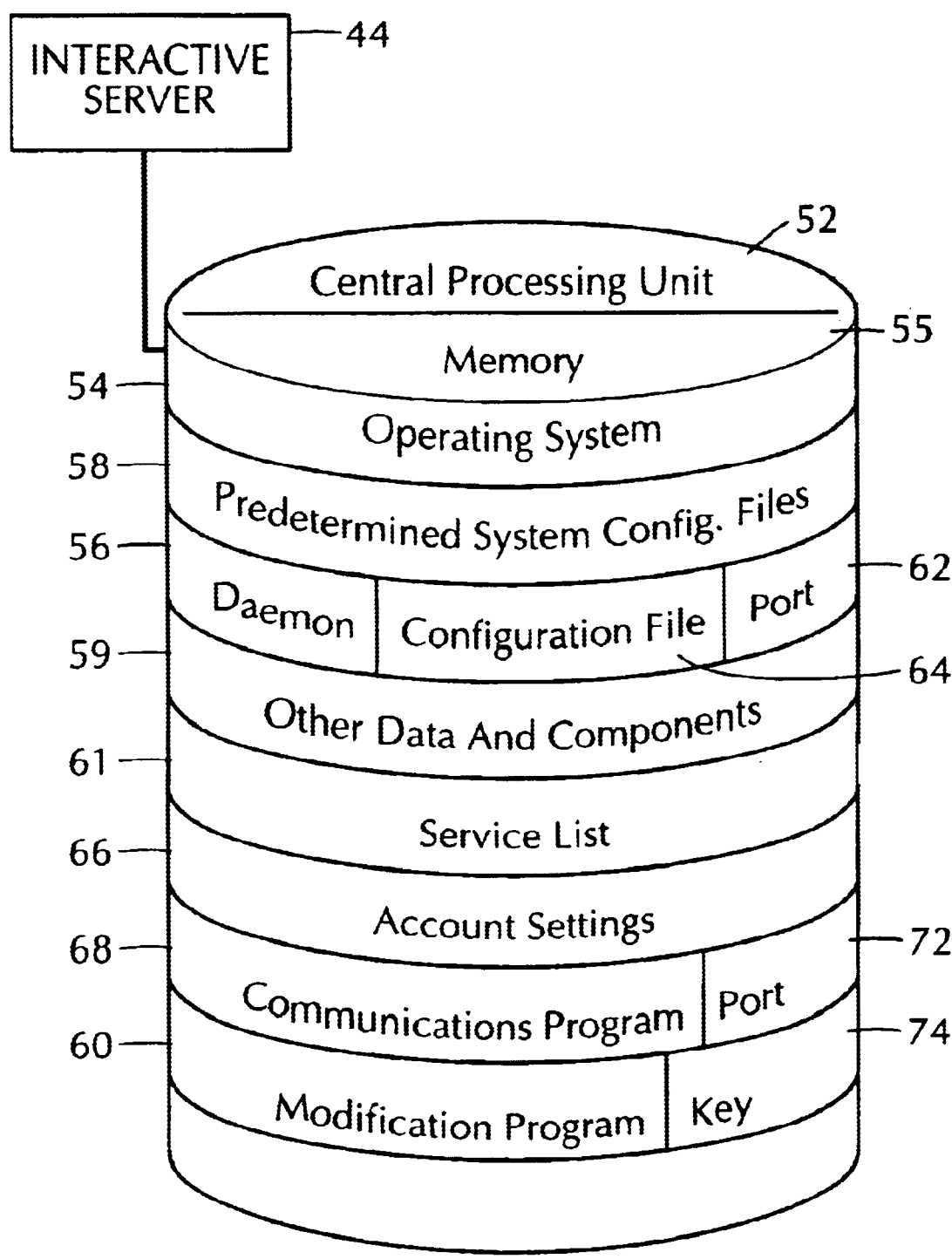
FIG. 4 is a block diagram of an exemplary interactive server, as used with the system of the present invention.

As shown in FIG. 4, server 44 has a central processing unit 52 and an operating system 54, such as a UNIX or a LINUX operating system, as two examples. Any operating system for servers or similar machines may be used. The operating system 54 executes programs that provide one or more services via the network 16 called daemons 56. A daemon 56 is a program or application software to locate and open a designated port, such as 62, from which services are offered from server 44. The daemon 56 is stored (i.e., downloaded from a source) into files or dedicated databases (i.e., hardware or memory) associated with the server 44, along with the operating system 54 and other data, memory and components (including hardware and software) 59 used to run the server 44.

Port 62 identifies the location in the server 44 that a particular service is provided by the daemon 56, which may be accessed. The port 62 is configured or programmed on the server 44 using well-known port numbers or other numbers desired by a computer programmer. Each service offered by server 44 will be identified by a service name, such as FTP, that is associated with at least one port number. Preferably, there is at least one daemon 56 for each service that is available from the server 44. For example, if server 44 provides Internet, mail, web and FTP services, it will have an Internet daemon, a mail daemon, a web daemon, an FTP daemon and the like that relate directly to the services available on the server 44 to the client 14.

The service name for each daemon 56 provided by server 44 is maintained in a service list 61 that is stored within memory or system files located within the server. The service list 61 may be stored in a format such as "service port/protocol", that maps the "service", "port" and protocol together. The "service" identifies the particular service name, the port defines the port number the service is offered on, and the protocol defines which transport protocol is used. The transport protocol should be compatible with the protocol used by the server 44 to communicate with the client 14. It is contemplated that server 44 may have as many ports as necessary to provide access to the services provided by the daemon 56.

The daemon 56 has software routines that wait for incoming connections on the server 44 for the service that is running. For example, an inbound request is received by the server 44, the software routine creates a child process that accepts the connection request to open the assigned port so that access to the service is gained, while the parent process continues to listen for further inbound requests. Thereafter, the software routines of the daemon 56 direct the request to the appropriate port. Preferably, to accommodate numerous inbound requests, the daemon 56 creates sockets on behalf of the service running on the server 44 to listen for all inbound requests simultaneously. When an inbound connection is received on any one of these sockets, the daemon 56 accepts the connection and connects the request to the specified port. In this way, the daemon 56 is adapted to handle multiple requests at a time, without delay in connecting the request to the port so that the service may be provided.

It should be understood that the daemon 56 may be associated with and/or provide at least one service or a plurality of services provided by the application software running on the server 44. How the daemon 56 operates is largely depended upon how the daemon is programmed by a computer programmer. For example, the daemon 56 may be programmed to utilize the "server/port/protocol" files maintained in the server 44 to route inbound requests to one or more particular services. As an alternative, it is contemplated that each service running on the server 44 may be stored within the service list 61 which will be used by the daemon 56 to route inbound requests to the proper port associated with the service list. As another alternative, the operating system 32 of the server 44 may include a portmapper. The portmapper is a program that maintains a list of the assigned ports for the services offered by the server 44 so that the daemon 56 and ultimately the client 14 may locate the proper port in which a particular service is offered.

The daemon 56 routes inbound connections using a transfer protocol that is compatible with the inbound requests, such as a request from a browser. The transfer protocol used with the daemon 56 utilizes the TCP/IP or UDP/IP protocol used for Internet® connection, or any other type of protocol used to route requests, which are typically in the form of packets. Thus, the protocol that is used should know the start and the end of the packet before the request is routed to the desired port.

Preferably, each daemon 56 running on server 44 will have a separate IP address to identify that service in the network 16. As explained previously, the IP address comprises a set of numbers known as a network number that identifies the source of the service from the host 12. The network numbers may be created by the programmer for private use in a local network (LAN, WAN, etc.) or issued through Regional Internet Registries (RIRs) such as the American Registry for Internet Numbers (ARIN), Réseaux IP Européens Network Coordination Centre (RIPE NCC), or Asia Pacific Network Information Centre (APNIC) for use on the Internet®. The network numbers, and thus the IP address, may then be mapped as part of the URL, to provide a readable name to identify the address of the service which can be accessed by the client 14.

The daemon 56 may be programmed in high level, object oriented programming language, such as JAVA, VISUAL BASIC and C++, and other programming languages. High level languages are converted to machine code by programs such as compilers or interpreters stored within the server 44. A compiler converts an entire program specified by high-level source code statements into a corresponding set of machine-level object code instructions. Interpreters also convert statements in high-level language into machine code, but operate one statement at a time. Both compilers and interpreters convert source code to object code using a parsing and code generation step. The parsing step interprets the human readable source code to determine the sequence of functions specified by the programmer. This step also checks the source code to ensure that each statement is valid in the defined syntax of the highlevel language. As each statement is parsed by an intepreter, the code generation function is invoked to cause the hardware and operating system 54 of the server 44 to execute a set of object-code instructions that implement the functions of the source-code statement. Once the entire-source code has been parsed and converted into object code, this array is written and stored within memory 55 of the server 44 as an object-code file for execution by the operating system 54 to make the service available to the client 14, such as through daemon 56.

The daemon 56 running on server 44 is programmed to locate, edit or configure the predetermined system configuration files 58 associated with the operating system 54 that are used to make services available to each client 14. The operating system 54 has a number of server configuration and executable files or programs that are used to configure the hardware and software of the server 44 to provide the services made available to the client 14 through the daemon 56. The server configuration file is a program written in high level computer language that includes a list of executable commands, sequences and options that are required to be executed by the operating system 54 of the server 44. These executable commands, sequences and options are executed by the operating system 54 to setup or modify the service made available to the client 14 as desired by the client 14 or specified by the host company. In that way, the server configuration files associated with the operating system 54, define a first part of the predetermined system files 58 that may be located and edited to automatically configure the operating system 54 and thus, the server 44, to make a service available to the client 14.

Likewise, the daemon 56 has a configuration file 64 that forms a second part of the predetermined system configuration file 58. The configuration file 64 contains a sequence of commands, options, and instructions that may be written by a computer programmer to control the manner in which services will be available to the client 14. For instance, the daemon 56 will have a separate configuration file that listens to network connections from the client 14. The daemon 56 may also include separate configuration files that control the protocol used, the type of service being made available, the location of the port, and any other feature that may be run by the daemon 56, such as a verification or authentication function. Each of the configuration files 64 used by the daemon 56 are written or programmed such that the daemon 56 may modify any of those files, as necessary, based upon the settings of the account desired or specified by the client 14. All or any number of the configuration files 64 may be designated by the programmer to be modified by the daemon 56, to control which configuration files to further define the predetermined system files 58 may be located and edited by the daemon 56.

It is also contemplated that other separate configuration programs stored within or external to the server 44 may perform the task of locating, editing and configuring the predetermined system configuration files 58. These configuration programs will operate in much the same way as the daemon 56 described above, to configure the predetermined system configuration files 58 as necessary to make a service or a series of services available to the client 14 as desired or specified by the client 14. Other means for automatically configuring the server 44, daemons 56 and operating system 54 are contemplated.

In the preferred embodiment, the daemon 56 is programmed to automatically setup, locate and edit specific predetermined files as necessary, such as configuration file 64 and the configuration files of the operating system 54. To setup, locate and edit specific files, those of ordinary skill should understand that a separate setup or modification program 60 should be written that will instruct the daemon 56 to search for the particular configuration file 64 or configuration file of the operating system 52 that may be necessary to either setup the services desired by the client 14 or to modify those services, such as the type of service. For example, the program 60 may be written to instruct the daemon 56 to setup or modify the location of the port of the service, the transfer protocol used, the capacity of the service and the like. Likewise, program 60 is written to react to settings of the account of the client 14 that may be changed, removed or modified. As the settings of the account are added or changed, program 60 has a set of commands, sequences and options that will initiate subroutines and subprograms to create any configuration files 64 that may be needed, or to remove or change existing configuration files, such as file 64 and the configuration files of the operating system 54. Program 60 may be written in the same high level language as that used for the daemon 56 or any other type of language. The program 60 is written to automatically know, locate and/or configure the specific predetermined files, such as files 58 and 64, without the need for input of a system administrator.

It should be further understood that the daemon 56 and configuration files 64 are programmed to be separately configured to deliver services that are unique to each client 14. Preferably, the daemon 56 is programmed to set up a separate configuration file associated with account settings 66 of the client 14. The configuration files associated with each client account is stored in client system files 58 of the server 44 and contains a sequence of commands to instruct the operating system 54 to initiate, create, add, change, or modify the services available to the particular client 14 through the daemon 56. The commands include a set of sequence or instructions and operations that are executed by the daemon 56 or operating system 54 to manipulate (i.e., locate, add, change, delete, replace, or configure) the high level source code and/or machine code of the predetermined system files 58, configuration file 64, and other data, memory and components 59 of the server 44 in order to make the services available to the client 14 according to the account settings 66 or other account information. The sequences are initialized based upon inbound communications received from the client 14, received from other servers of the group 40, or received from the database group 42. Upon initialization, the sequences generate the necessary internal machine language commands to automatically configure the operating system 52 and daemons 56 relative to account settings 66.

The account settings 66 are parameters and settings associated with a client 14 account that relate to the nature and type of services to be provided by the daemon 56 that are desired by the client 14. The account settings 66 are a function of the services that are available to the client 14, and may include criterion such as the users for the account, the size of the account, the type of passwords used, the services offered to the client 14, the type of service desired by the client 14, and conditions of the account (such as restricted access or use), and the like. The account settings 66 are used by the daemon 56 or server 44 to setup, add, change, delete or modify the services available to the client 14. At least one account setting 66 is associated with each service available to the client 14. As such, it is contemplated that a client may have one or a plurality of accounts settings related to each of the services that is available from the server 44.

The daemon 56 of server 44 is programmed to provide one or a multitude of services such as Mail, file managers, account setup files, web pages, Secure Sockets Layer (SSL), CGIs, gateways to external web sites, file transfer protocols (FTP) to permit clients to up date web pages, authentication programs to identify and verify the identity of the client, Log, and other services that may from time-to-time be offered by the hosting company. For instance, server 44 may run an SSL server, web server, FTP and the like by downloading (i.e., storing into system files) the appropriate daemon into the server 44. To provide different services, the server 44 will be setup such that each daemon running a service will be associated with a separate or at least one predetermined system file 58, configuration file associated with the operating system 54, configuration file 64 associated with the daemon 56, ports, and account settings 66.

It should be noted that a Log server is typically a server that offers no services to the network and does not support user accounts. Rather, Log is generally used as a program to store the activity of the server within files and/or databases contained within the server or externally to another server. The data may be written into a single file, multiple files, and/or a database, or sent to another computer or server external to the network, such as server network 16. The Log provides a valuable security device in tracking activity and can be advantageously used to gauge the capacity of the server network 16.

Returning to FIG. 3, server 44 is also programmed to selectably communicate with one or more of the other servers 46, 48 and 50. Server 44 is capable of communicating (i.e., the server is "communicatable") with each of the other servers either separately, continuously and/or at selected times. To communicate with the other servers, server 44 has a communications program or daemon 68 (see FIG. 4). The communications program 68 enables the server 44 to interact with, contact and communicate with other servers of group 40 through an internal communications network or 70. Internal switch 70 is a private network machine, gateway or conduit in which one or more of the group of servers 40 may fetch, exchange, or swap information, data, instructions, files and programs between and among each other and the database group 42. In the preferred embodiment, internal switch 70 has a machine that comprises a series of compatible communication software programs that are stored within files located in the machine. The communication programs comprise a sequence of commands and instructions to enable one of the servers of group 40, such as server 44, to establish a connection with one of the other servers to exchange information. Information is exchanged to setup, add or modify the system files 58, configuration file 64 and files of the operating system 54 that are used to make the services from the daemon 56 available to the client 14.

Preferably, internal switch 70 is not accessible externally, such as through the Web, Internet® or other external communications, which is one of the features of the invention. The internal switch 70 only permits data and information to be exchanged between and among the servers of group 40 and the database servers of group 42. This creates a private network for the exchange of information, which ultimately enhances the security of the system 10 by reducing the risk that an eavesdropper could gain access to data of the client 14. However, it is contemplated that internal switch 70 can be put onto the Internet® as an external communications network. If the internal switch 70 is placed over the Internet® or any other public network, the communications link between the servers in group 40 and the servers in group 42 will be encrypted, using standard secure cryptography protocols.

In order to handle multiple communications, it is contemplated that server 44 may be distinguished from other servers of group 40 by a server identification number (ServerID). The ServerID may be any set of alphanumeric data, converted into machine language that identifies and distinguishes one server from the other based upon attributes, such as the location, capacity, services, clients assigned, system status and other criteria. The ServerID acts as a license plate that is used by the system 10 to identify each server that is used as part of the server group 40 so that any inbound communication will be directed to the proper server. The ServerID for each server of the group 40 is stored in a server list maintained by the database group 42. Other means for distinguishing the identity of one server of the group 40 from another may be used.

As best seen in FIG. 4, server 44 has a communications port 72. Port 72 enables server 44 to establish a communications link to one or more of the other servers in group 40. Similar to port 62 used to identify the location of services in the server 44, port 72 is a number that identifies the location of the communication program that is used by the server 44 to receive inbound connections or calls from other servers (i.e., "caller server") through internal switch 70. Once the inbound connection is received by the server being contacted (i.e., a "receiver server"), the two servers are in communication and may interact with each other to exchange data, files, data, or other executable information between each other using a compatible high-level computer language. For example, server 44 can selectably establish a connection with one or more of the other servers of group 40 repeatedly, simultaneously or at different times using the designated port in the receiving server, such as port 72. When server 44 is in the capacity as a receiver server, server 44 can disconnect or hang-up its connection with the caller server. The receiver server may hang up its connection with the caller server in response to certain instructions, commands or preconditions being met that are programmed into the communications program 68.

To aid communications, server 44 preferably has a transferable, communications exchange key 74 that is used as part of the communications program 68. Key 74 is not a typical cryptography key that is used to encode communications of data for security. Rather, key 74 is generated as part of the communications program 68 of the server 44 to enable each interactive server of group 40, such as server 44, to contact, interact and communicate with each of the other servers of the group 40 through internal switch 70. The key 74 comprises a set of instructions, commands or conditions that instruct the receiver server to contact the database server group 42 to determine what work has to be performed to setup, add, delete, or modify the predetermined system files 58, configuration files associated with the operating system 54, the configuration files 64 associated with the daemon 56, one or more of which are used in configuring the server 44 to make services available for the client 14.

Preferably, the key 74 is a transferable file that contains instructions or commands to direct the receiver to establish a connection with the database group 42. The file is transferred from the caller server to the receiver server. Once received by the receiver server, the key 74 is stored within a temporary session file to provide a reference that is used by the receiver sever to check the database group 42 for tasks or work to be performed to automatically setup and configure files associated with a particular service available to the client 14 from the daemon 56. Upon receipt of the key 74, the receiver server will hang-up its connection with the caller server and obtain whatever work, tasks or instructions that have to be performed as instructed by the database server group 42. Once those tasks are performed, the receiver server will use the key 74 to re-establish a connection with the caller server to provide information relating to the tasks that were performed. Such information may include a report that certain services were setup for the client 14, certain system files were setup or manipulated, and the like. The keys may be generated each time a connection has to be made by one server of group 40 to another server of group 40, or saved in a temporary file for later use.

The key 74 may be handed-off from server to server of the group 40 to establish communications with each other. The key 74 provides a useful tool to enable and instruct the receiver server to contact the database server group 42 to identify what tasks and services have to be performed to setup, add, remove or configure an account or service for a client 14. It is contemplated that one or a plurality of keys may be generated by each server of the group 40. Each key is preferably associated with at least one client and is used as a means for automatically configuring the services desired by the particular client.

Information and data used by server 44 to setup, add or change services provided by daemon 56 for an account, are releasably stored in retrievable files located in the database server group 42. The database group 42 provides as a central repository of retrievable data associated with the services that are running on the server 44 as part of the account settings 66 of the client 14. As shown in FIG. 3, the database group 42 comprises a plurality of discrete, external database servers (four shown) 76, 78, 80 and 82. Although four database servers are shown, it should be understood that the invention is not limited to any specific number of database servers. As few as one or any number of database servers may be used to form the database group 42. For example, it is contemplated that at least one database server, such as 76, may define the group 42 or a plurality of different database servers that are in communication with the server group 40, individually or jointly, also defines group 42.

Each database server 76, 78, 80 and 82 has a plurality of database files, associated with the client 14. The files are configured to fetch data stored relative to the client 14, such as account settings 66 or account information associated with the client 14 that is releasably and retrievably stored in the database file. It is contemplated that identical information is replicated on each database server 76, 78, 80 and 82 so that any one of the database servers may be used to support the services provided by any server of group 40. Because each database server 76, 78, 80 and 82 are basically the same, the description of database server 76 will be representative of the others.

Figure 5:
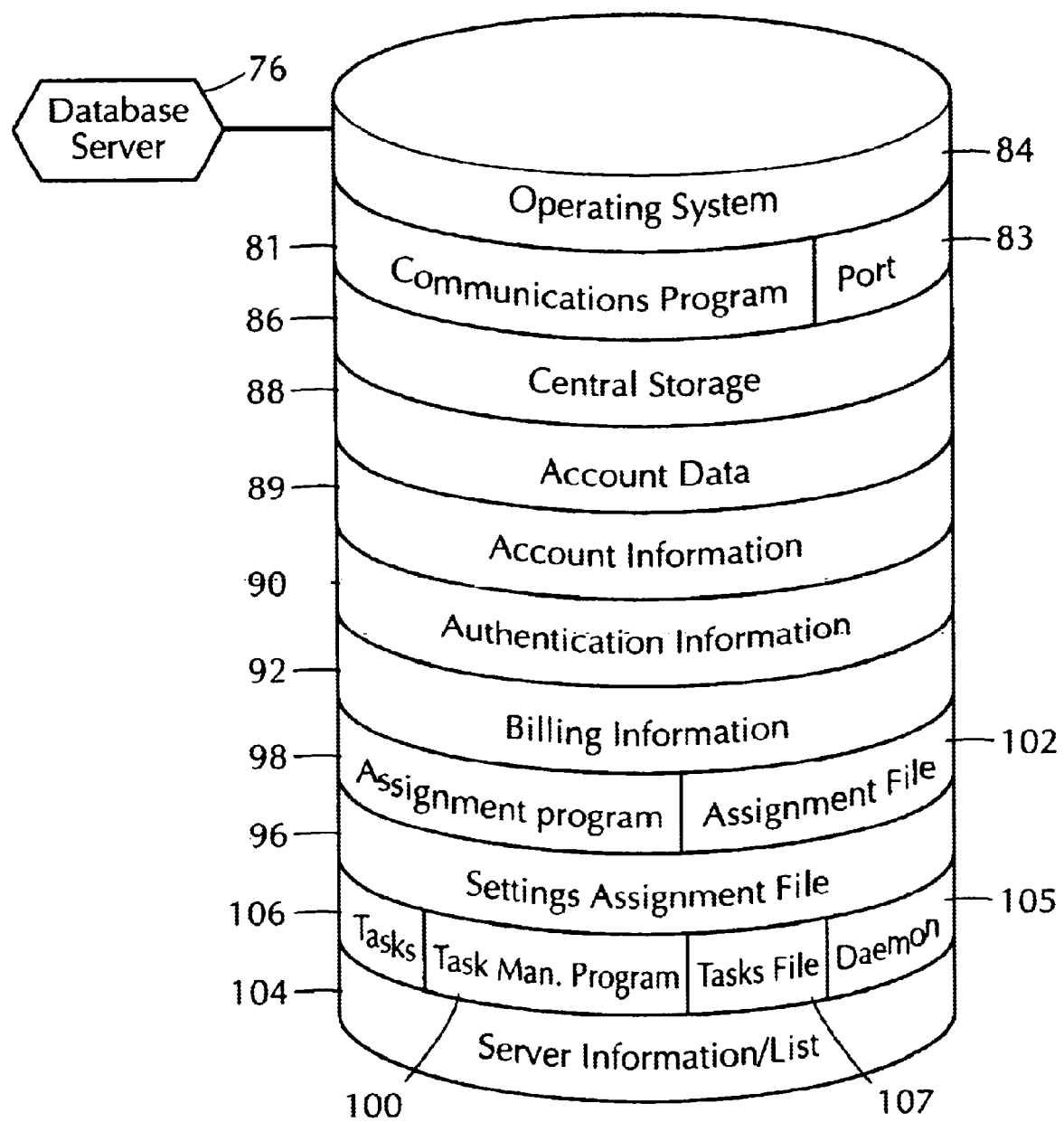
FIG. 5 is a block diagram of an exemplary database server, as used with the system of the present invention.

As illustrated in FIG. 5, database server 76 has an operating system 84 that may be compatible with the operating systems of the sever group 40, such as a UNIX or a LINUX system or any other system desired. It is not necessary for database servers in group 42 or the interactive servers of group 40 to utilize the same operating systems, as long as any server within any group 40 or 42 communicates with standard protocols such as TCP/IP and UDP/IP. The operating system 84 is used to run a communications program 81 that permits database server 76 to selectably communicate with one or more of the servers of group 42 and group 40. The communications program 81 operates similar to communications program 68 through port 83, such that database server 76 is capable to communicating (i.e., the database server is "communicatable") with the servers of group 40 and 42. Port 83 enables data to be exchanged between and among each server of group 40 using the internal switch 70. In that way, information that is stored in one server, such as 76, may be exchanged and replicated the other database servers of group 42. In that way, each database server of group 42 may be configured to communicate, contact and interact with each other.

A central storage means 86, such as a database file or "brain" is located in database server 76 to releasably retain account data 88. The account data 88 comprises information associated with the services made available to the client 14, such as the account settings 66 and client account information 89. The account information 89 comprises attributes of a client's account, such as the name of the particular user or client, account verification and authentication information 90, billing information 92, a list of the settings 96 of the services desired by the client 14, and the like. The authentication information 90 includes credentials that will uniquely identify the client 14 to the system 10 and grant access to the network 16 when the client 14 logs in. The authentication information 90 may comprise the end-user's name, passwords, email address, domain names, contact information, and similar data so that the system 10 can distinguish one client from another. The billing information 92 includes payment information such as the payment options (i.e., credit card, checking account), credit card number, card expiration date, name and address of cardholder, and other methods in which the client can be charged for services provided by the system 10.

The database server 76 preferably maintains the account data 88, account information 89, authentication information 90, billing information 92, and settings 96 in separate files, sometimes called maps. The maps are stored in database management library files locate in central storage 86 and are associated with search operations so that the maps for a particular client may be located. Each map simply contains a list of the account data 88, account information 89, authentication information 90, billing information 92 and settings 96 in an organized way so that one ore more of the servers of group 40 may access them.

An assignment program 98 and a task or client management program 100 are maintained in database server 76. The assignment program 98 is a program written in high level computer language that is used to assign the client 14 a customer identification number (ID), a password, and to the services running on one or more of the servers of group 40. For example, the assignment program 98 will assign each client to a mail server, a log server, an ftp server, a web server, an SSL server, a real server, a shell server, and FTP server, and the like. The details of each assignment associated with the client 14 is stored as an assignment file 102. The assignment file 102 is then stored as part of the account data 88 or account information 89 located in the database 76.

The assignment file 102, together with the authentication information 90, may be used by the server 44 to verify the identity of the client 14 to the system 10. Preferably, each server of group 40 has a verification or authentication program to verify credentials of the client 14, based upon the information stored in the account information 90 and assignment file 102. For instance, during a log-in process, the credentials from the client 14, such as customer ID, password, end-user name, client and the like are transmitted to an SSL server (such as server 44). The SSL will initiate a comparator program to establish a connection with the database sever 76, through switch 70. The database server 76 will fetch the customer ID and password associated with the client 14 from the account data 88 or assignment file 102 (including the authentication information 90) and transmit that information to the SSL for comparison. If the comparison is not favorable, the identity of the client 14 is not verified and access to the host 12 will not be granted. However, upon favorable or positive comparison, the authentication program will generate and transmit a signal or statement to the server 44 verifying the identity of the client 14.

The database server 76 also maintains a database of server information 104 associated with each service that may be run by the server 44. The server information 104 comprises a list which includes a description of each service, the port from which the service is offered, the daemon controlling access to the port, the protocol used for the service, and the configuration file of the server. The database sever 76 also maintains state information as to the status of the service or services which are being provided by the server 44. The state information may indicate whether the service is running on the server 44 or another server, whether the service has been setup or if the service has to be setup, added, removed or changed.

The task management program 100 has a task program or daemon 105 that generates a list of executable and transferable tasks or work 106 to be performed by each server of the group 40 to setup, add, or modify the services available to the client 14. The tasks 106 comprise one or more instructions, commands, sequences and settings, that are created by the task program 105 based upon the account settings 66, account data 88, account information 89, authentication information 90 and/or settings 96. The task program 105 has been programmed to use the information maintained in one or more of those files to create the tasks to be performed by the daemon 56 or operating system 54 to configure the predetermined system files 58 (i.e., the configuration file 64 and configuration files of the operating system 54 of server 44) to add, change, remove and modify the services available by the daemon 56. The tasks 106 are preferably maintained in a task or work file 107.

The task program 105 is written in high level language and has a separate task configuration file containing its commands. The task program 105 is initiated automatically by the database server 76, when the settings of the service to be made available to the client 14 is created, changed or deleted. For example, the task program 105 may be initiated each time a client is added or when the account settings 66, account information 89, billing information 92, authentication information 90, settings 96 or any other information associated with the account of the client 14 are added, deleted or changed. These particular files may be manipulated by the client 14 when, for example, the client 14 changes or adds a user, requests a different type of service, deletes a particular service and the like. As such, the task program 105 responds to the type of service that is desired by the client 14, by generating the tasks 106 based on account information associated with the client 14. It is contemplated that a new task(s) may be generated and maintained by the database server 76, if necessary, each time the account settings 66, account information 89, billing information 92, authentication information 90, settings 96 or other information associated with the client 14 are changed by the client 14 or other sources, such as by the hosting company.

The tasks 106 are advantageously used by the server 44 or daemon 56 to setup and configure the predetermined system files 58, configuration files 64 associated with the daemon 56, and configuration files that are used by the operating system 54 of server 44. The tasks 106 are transmitted by the database server 76 to the server 44 upon a connection being established using the communications programs 81 and internal switch 70. Upon a connection being made, the server 44 will access the tasks 106 preferably, but not necessarily, by generating a fetch command which asks the database server 76 what tasks or work has to be preformed, if any, to setup, add, modify or remove the services offered as part of the account of the client 14. It is contemplated, that the database sever 76 may be programmed to transmit the tasks 106 to the server 44 after it is contacted.

During that connection, the database server 76 will compare the state information with either the account data 88, account settings 66 and/or the account information 89. Based upon that comparison, the task program 105 will generate the necessary tasks 106 that will be used by the server 44 (including the daemon 56 or operating system 54) to setup or change the account for the client 14. The tasks 106 are then transmitted to the server 44 for execution. Once the task are transmitted, the database server 76 will disconnect from the server 44 and will await a further connection from the server 44, indicating that the tasks have been performed and the account is setup or changed. Once the tasks 106 are performed, the server 44 will reestablish connection with the database server 76 to indicate that the account is setup or changed. The database server 76 will indicate in the state information that the task is completed. As such, the tasks 106 or "work" generated by the database server 76 are advantageously used by the database server 76 to manage the work the sever 44 has to perform to setup, add, change, manipulate or modify the settings and service desired by the client 14. Use of the tasks 106 helps to eliminate and automate the work otherwise performed by a system administration to setup, add, modify or delete services available to the client 14.

It is contemplated that a plurality of different tasks 106 may be associated with the account data 88, account settings 66 or account information file 89 associated with each client. Each task (Tn ... Tl, where "n" represents a client and "i" represents an infinite numbered client) includes the name of the client, the service(s) to be provided, the predetermined system files to configure, and the type of setup-commands, i.e, functions, commands, and operations that from time-to-time are generated, executed or performed by each server to make the services from the daemon 56 available to the client 14. In that way, the tasks are unique to the particular account requested by the client 14, so that the service(s) desired as part of the client 14 account will be properly configured.

One of the features of the invention is the interaction and exchange of information between and among the database group 42 and the server group 40. The database group 42 operates as a "middle man" between the services running on the servers of group 40. By maintaining the data used to run the services in a separate database, such as server 76, the speed, efficiency and capacity of each of the server of group 40 to deliver services to one or more clients of the system 10, are enhanced. Another feature of the preferred embodiment of the system 10 is that the database server 76 is not connected directly to the client 14. By eliminating direct communication between the client 14 and the database server 76, the account data 88 and account information 89 used to offer the services to the client 14 is not transferred over the Internet®. Therefore, the information maintained in the database server 76 is not accessible to third party eavesdroppers to the system 10. This feature is advantageously used to enhance the security of the system 10.

It should be understood by those of ordinary skill in the art that the database server 76 is setup to maintain a plurality of accounts for each of the clients of the system, such as client Cn to Ci (where "n" represents a client and "i" represents an infinite numbered client). The database server 76 will create as many account information files, authentication files, setting files and task information files as necessary to support each client Cn to Ci. If the number of clients increases beyond the capacity of the database server 76, additional database servers may be simply added, without any disruption in the services provided to the clients. To that end, each database server will have replicated thereon the same information maintained from database server 76. The more database servers there are, the more redundant the backup or backend of the system 10 becomes.

Figure 6:
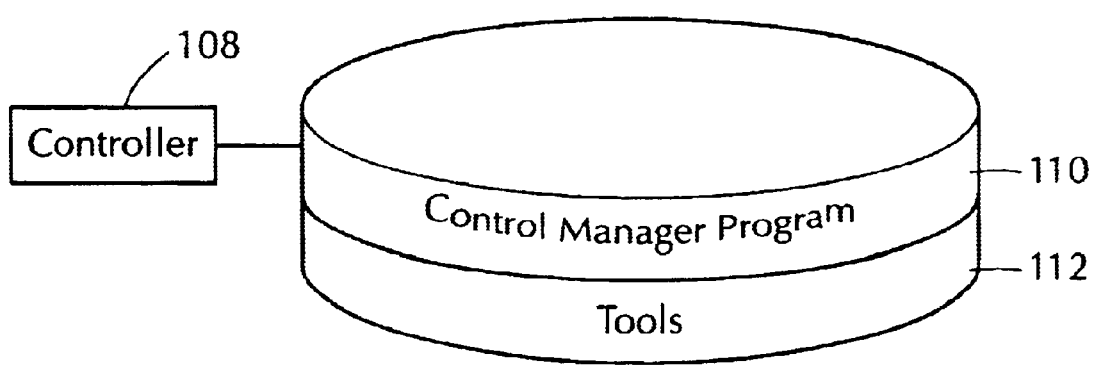
FIG. 6. is a block diagram of an exemplary controller, as used with the system of the present invention.

Preferably, the system 10 is controlled by a controller or manager 108 (see FIGS. 3 and 6). The controller 108 functions to provide a means to enable the client 14 to manage or control the services that are provided by the servers of the network 16. The controller 108 may be a server as part of the group of interactive servers 40 or may be a stand alone server that is connected to the network 16. It is also contemplated that the controller 108 may also comprise or be defined as a plurality of independent, stand alone servers.

The client 14 has access to the controller 108 through the external communications link 38 (see FIG. 3). External communications link 38 enables the client 14 to exchange requests and continuances with the controller 108. By utilizing the controller 108, the client 14 can selectably specify, remove, add, modify, or reconfigure the services that are being offered by one ore more of the servers of the group 40 as part of the account of the client. The information that the client 14 supplies will be used by the database server group 42 to modify the account settings 66, account data 88, account information 89, and other files associated with the services made available to the client 14. In particular, the information supplied by the client 14 to change information such as that contained in the account data 88, is used by the task program to create or change the tasks 106. In that way, the controller 108 is advantageously used to facilitate the task of adding, modifying, or deleting services offered by server group 40 from a particular server daemon, such as daemon 56, by changing the tasks 106. Once the tasks 106 are generated or changed, they can be used by the server group 40 to modify whatever predetermined system files that are necessary to make the service(s) available to the client 14 as desired.

In the preferred embodiment, the controller 108 has a control management or administration program 110. The control manager program 110 is used by the client 14 to manipulate (i.e., change, add or remove) account settings 66, account data 88, account information 89, authentication information 90, billing information 92 and settings 96 that are used by the server 44 to setup, change, remove or modify services available from the daemon 56. To make it easy for the client 14 to manage the account, the control program 110 has a graphic interface that is capable of being displayed on a monitor. The graphic interface is written in a protocol and language compatible with the operating system 54 of the server group 40. Preferably, the graphic interface has a series or a plurality of tools through which the client 14 may change, add, and modify the services available from the server group 40. The tools 112 include icons displayed on the graphic interface that provide access to a file manager, an email manager, FTP manager, and any other manager that is used to control the account data 88, account information 89, authentication information 90, billing information 94 and settings 96 retrievably stored maintained in the database server 76, associated with the client 14. Other means for controlling or managing the account of the client 14 and the services available from the server group 40 may be used.

For example, if the client 14 desires to add an email address, the control program 110 will at first verify the information provided by the client 14, by contacting one of the database servers, such as 76, to initiate the authentication process. If the information on the client 14 is verified, the control program 110 will establish a connection with the database server 76 through the internal link 70. The changes such as the new email address are then stored in the database server 76, by storing the information in the account data 88. The database server 76 will then run a check of the server group 40 to determine which server is running the service the client 14 has modified. Once the server is located, the database server 76 generates and transmits an instruction to the control program 110 to contact the server providing the service that was modified by the client 14. In response, the server contacted, such as controller 108 is running as a server, generates key 74 and establishes a connection to the assigned port of the server (i.e., the receiver server) through the internal switch 70. The key 74 will tell the receiver server, such as server 44, to contact the database server 76 for instructions as to what files have to be changed to modify the services. The receiver server will then contact the database server 76 to determine what task(s) have to be performed to setup the new email services desired by the client 14. In response, the database server 76 will transmit to the receiver server or the receiver server will obtain the tasks 106 that have to be performed to setup the new email account. After this information is passed, the receive server hangs-up its connection with the database server 76. The receiver server then executes the tasks that were received from the database server 76 so that the daemon 56 or operating system 54 or other programs will automatically configure the predetermined system files 58, configuration files 64 of the sever daemon, and/or the configuration files of the operating system 54, as necessary, to add the new email account. Once all the tasks have been finished, the receive server will establish a connection with the database server 76 to let the database server 76 know that it has accomplished the tasks. The database server 76 will record that the server 44 has completed its task and store this information in the state information. The database server 76 then hangs up the connection.

The controller 108 may be setup to provide a panel for resellers to manage the services being provided by the daemon 56. A reseller is a third party to the client 14 that sells the services offered from the host 12 to end users or other clients, such as client 14. It is contemplated that the controller 108, and the graphic interface of the control program 110, may be advantageously used by a reseller to monitor what type of services are being accessed by the clients. In addition, the reseller may use the controller 108 to activate, disable or delete a service of a particular client, using the same process that client 14 uses to add, remove, change or modify the services available from server 44 as described above.

It should be understood by those of ordinary skill in the art that, the system 10 is setup such that no server of group 40 is allowed to tell another server in that group what to do. Rather, the servers of group 40 are only programmed to run services and selectably contact each other to transmit instructions using the key 74 to contact or check with the database server 76. The database server 76 operates as the manager to manage the tasks that each server in the group 40 has to perform to setup and deliver the services to the client.

The servers of group 40 are different than those typically used in the prior art. In particular, servers of the prior art generally deliver the same set of services (Sn–Si, where "n" represents a service and "i" represents an infinite numbered of service) to each client assigned to the particular server, which depends upon the capacity of the sever to handle the request of the clients so assigned. For instance, it is known that servers may be of varying size and capacity, e.g., small central processing unit (CPU) size, large CPU size, different serial line speeds, and the like. However, despite the differences in the capacities of servers, hosting companies typically assign clients to servers that are well below the maximum capacities of the server so that the speed of the services available to the client from the server is not significantly reduced, especially during times of high demand. Therefore, hosting companies will "hook-up" an additional server (say a second server) when the limits or the capacity of the initial server used by the hosting company are reached. The second server is virtually identical to the first server in that the same set of services Sn to Si are offered to each client. When the limit/pre-set capacity of the second server is reached, the hosting company hooks-up yet a third server. This process continues as more clients sign-up for services from the hosting company. Nonetheless, each server can suffer from the same limitations. Namely, if too many clients demand services from the server at or about the same time, particularly the same class of services such as e-mail, other services provided by the server are compromised because the CPU can only handle but so many requests at a particular time. This is inefficient.

In comparison, use of the server group 40 in selective communication with the database server group 42 of the present invention provides a different client-server system. Each server of the group 40 may be programmed to provide at least one predetermined service to the client 14. Therefore, where a typical server of the prior art offers services Sn to Si in one server, the interactive server network 16 of the present invention separates servers to provide one or more of the services Sn to Si. In that way, in the event that the capacity of a server providing Sn is reached, additional servers providing the identical service S1 can be hooked-up or added to the system to accommodate demands from the clients. However, the additional server running S1 can be easily configured using the information stored in the database group 42. Likewise, the server running service S1 may be easily and automatically configured to run service S2, S3 and the like.

It should be noted that the physical location of the server group 40, database server group 42, and the client 14 is unimportant. The group of servers 40, 42 and the client 14 may reside in different geographic locations. For example, it is contemplated that the system 10 may be applied to a point-to-point network provided by telephone services, or other type of communications network, such as Ethernet network, a Local Area Network (LAN), in which a plurality of clients are physically connected (up to a few hundred meters) to the host computer 12. Likewise, it is contemplated that the system 10 may be applied in a Wide Area Network (WAN) in which the client 14, the server group 40 and the group of database servers 42 are separated by considerable distances, usually miles. It is also contemplated that the system 10 may be used in any intra- or internetwork in which networks of clients and external host computers are connected together in various locations throughout the world. It is further contemplated that individual servers within group 40 and group 42, such as server 44 and server 76, respectively, may be located anywhere in the world.

Figure 7A:
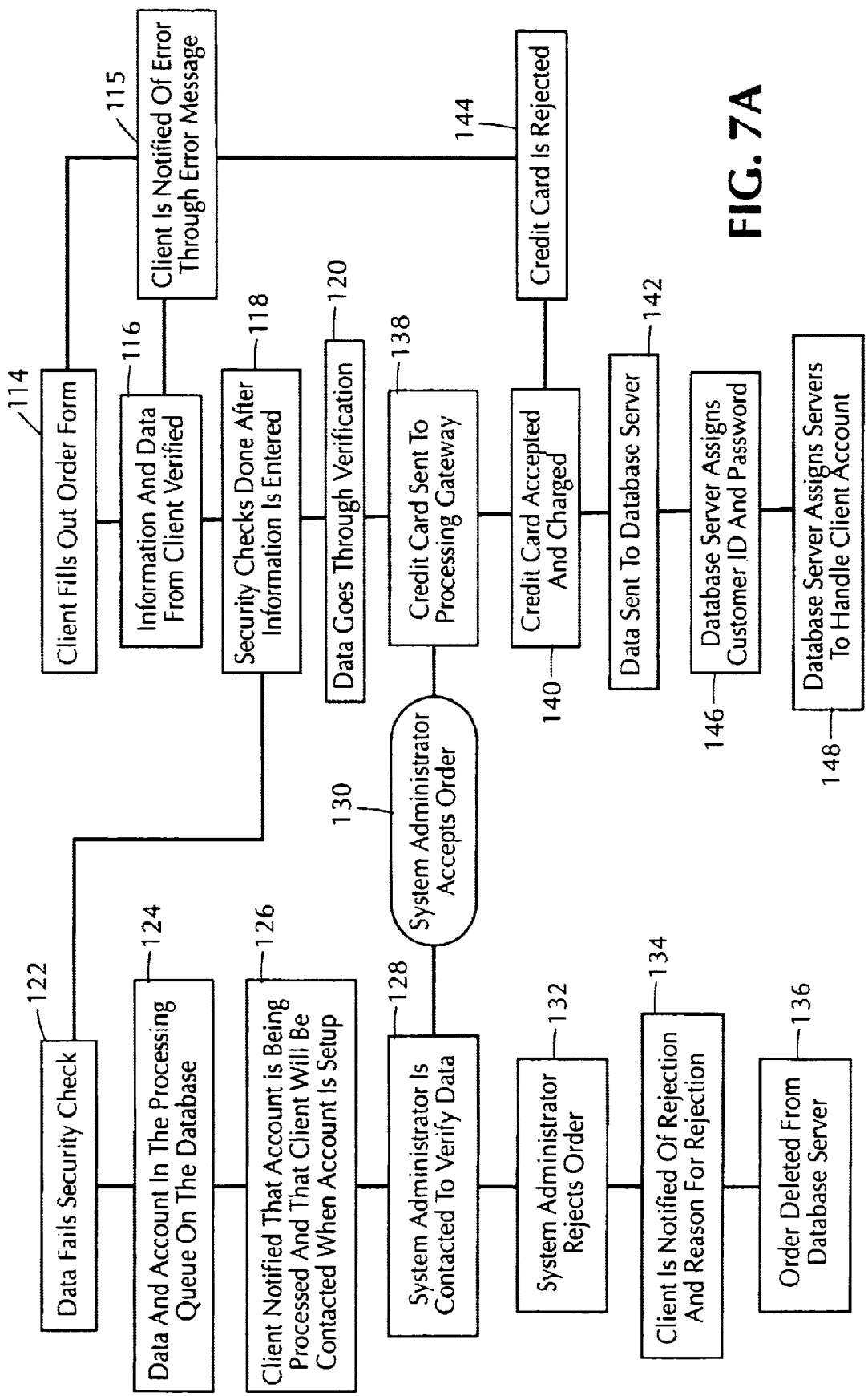
Figure 7B:
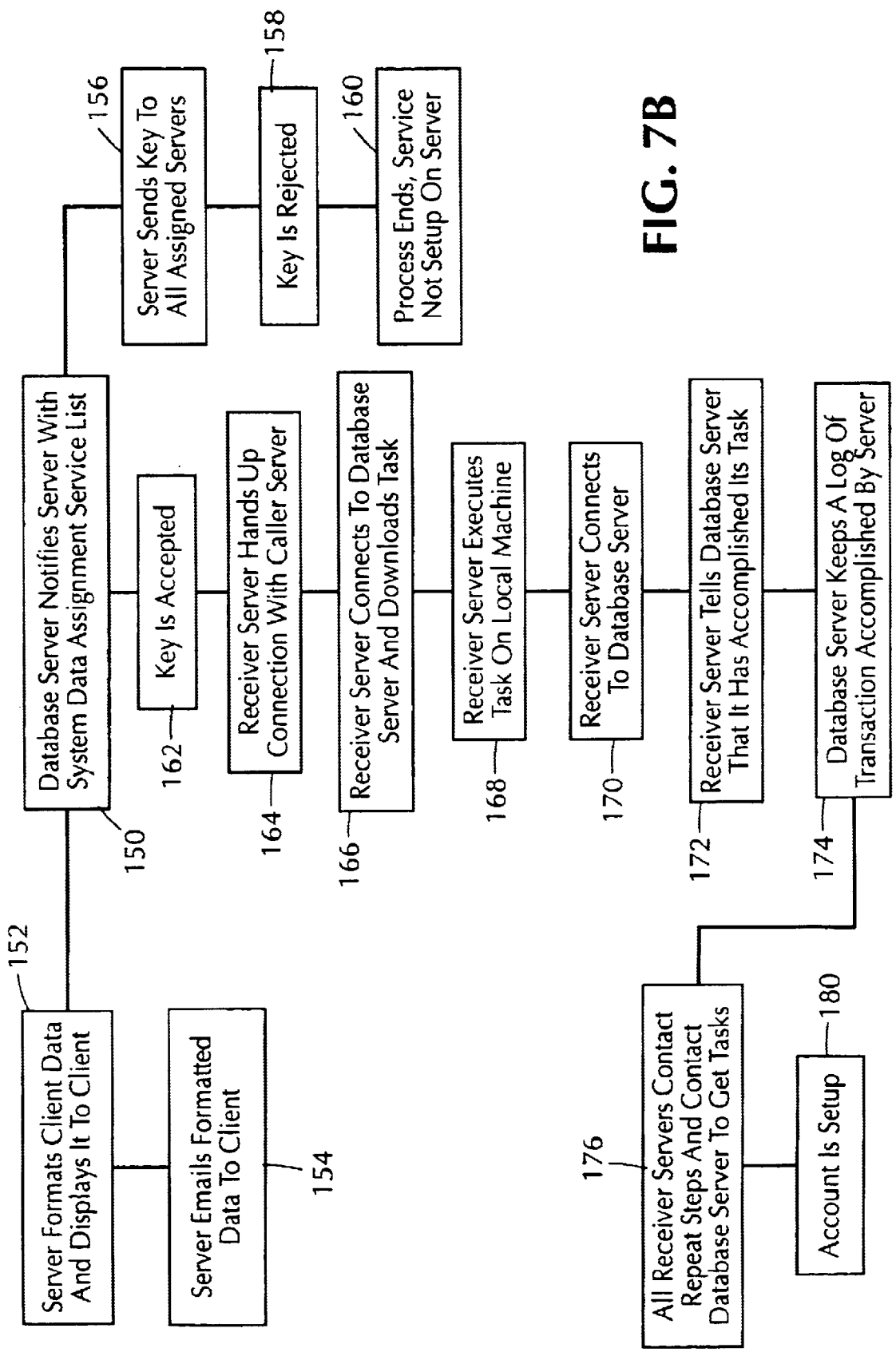

FIGS. 7A to 7C show the sequential steps for automatically configuring server daemons and operating systems to provide services to a client 14. Omitted from the description of the sequence are the steps of energizing the computer 18 run by the client 14 by turning it on such that the operating system 34, such as Windows, is initialized. It is understood by those of ordinary skill in the art that upon initialization, the operating system 32 loads in the client 14 the graphical user interface, through which the client 14 may execute application software and programs that are accessed by the computer 18 through a point and click operation, using the mouse 28. As these steps are common, a further description is unnecessary.

In block 114, the client 14 fills out an order form that is available on the graphic interface page, such as the web page, maintained at the web side of the host 12. The web page is provided in the HyperText Markup Language or Extensible Markup Language (XML) or any other compatible language. Access to the web site is gained by entering at the client 14 interface the appropriate URL that identifies the host company on the Web. Thereafter, the browser 36 will search the Web for the site of the host 12. Upon accessing the web site, the client 14 is directed to the controller 108 so that the client 14 may setup the services that are desired.

The web page is preferably, but not necessarily, maintained on the controller 108. The web page has an "Order Form" that is generated by an account setup program running on one of the servers of group 40. The order form is used so that the client 14 may enter information used for the account settings 66, account data 88, account information 89, and other information necessary in setting-up the account. For example, the order form will solicit from the client 14 contact information, billing information, and information such as the services that the client 14 is requesting. The contact information will include the username(s), password(s) requested, email address(s) requested, email password(s) requested, domain name, present email address, the company name, first name, last name, address, city, state province, etc. The billing information which may include the credit card company, account number, card expiration date and the name and address of the card holder. The billing information will travel through a Secure Socket Layer (SSL) enabled web page which allows the client to submit sensitive information. The order form will include "slots" or areas on the web page in which all of the above information may be entered or typed in by the client 14.

Preferably, when the client 14 purchases services from the host company, the order form will be available from a Secure Socket Layer (SSL), which for the purpose of this example is running on server 44. The SSL is a general purpose protocol for sending encrypted information over the Internet®. The SSL exists between the TCP/IP protocol and the application software running on the server 44 so that information that is sent is to the server is secure from third party eavesdroppers, using an appropriate cryptography.

Next, the client 14 uses the pointer (mouse) 28 to "point and click" on the submit button that is displayed on a portion of the order form. When the client 14 clicks the submit button, the data that was entered by the client 14 is transmitted utilizing the SSL protocol to the controller 108 for verification. During the verification process, the authentication or verification program running on the SSL server will review the contact information and other data that was entered by the client 14 to ensure that all pertinent information is entered correctly. For example, if the client 14 omitted a name or did not include the credit card number, the verification program will generate an "Error Message", at block 115. The Error Message is generated by the authentication program and transmitted to the client 14. The client 14 receives the Error Message which is displayed on the monitor 30 so that the client 14 may correct the error. Preferably, the Error Message will display specifically what the problem is to the client 14, such as which specific information was omitted.

Once all of the necessary information is verified at block 116, the SSL server will perform security checks based on the information provided. The security check is performed by a security verification program running on the server at block 118. The security program will generate a command to instruct the SSL server 44 to establish a connection with the database server 76. The connection is made through the internal switch 70 using communications programs 68 and 81. Once a connection is made, the database server 76 will temporarily store the contact information provided. Once the contact information is stored, the connection is terminated. The contact information will be used by the database server 76 to setup the account data 88, account information 89, and other account information for the client 14.

Upon the connection being made, the SSL server will verify the public domain information that was provided by the client 14. The public domain information may include the domain name or email address that was entered by the client 14. To verify this information, the SSL server initiates a domain subprogram to establish a link to the domain name registry through the external communications channel 20 or through a gateway that may be used to connect the system 10 to other networks available through the Web or Internet®. To connect to the domain name registry, the domain subprogram accesses the appropriate web site for the domain registry, such locating the URL address to access the records of the Internic database. Once the URL is entered, the SSL server is connected to the registry. The domain name subprogram has been programmed to search itself or to use a search operation provided by the registry to verify whether the domain name entered by the client 14 is in fact owned or registered to the client 14. If the domain name provided by the client 14 is verified according to the records in the registry (i.e., there is favorable comparison with the information provided by the client 14 and the information stored in the records of the domain name) at block 120, the SSL server will disconnect its connection with the domain name registry. Thereafter, the SSL server will skip to the payment step, block 138.

If there is no favorable comparison, or the client fails security check at block 122, the SSL server will disconnect from the domain name registry. Then, the SSL server will initiate its communications program to reestablish a connection with the database server 76. The connection will be made through the internal communications link 70, so that the SSL server can transmit the data provided by the client 14, (i.e., the contact, billing and server information) to a temporary database or file, known as a processing queue located in the database server 76, at block 124. Thereafter, the SSL server 44 will generate a message that is transmitted to the client 14 through the external communications channel 38 that the account is being processed and that the client 14 will be contacted when the account is setup, at block 126. The client 14 receives this information in the form of a message that is displayed by the browser 36 of the graphical interface located on the computer 18 of the client 14.

After the message at block 126 is displayed, the system administrator is contacted to verify the order, at block 128.

The system administrator's verification is used as a backup to determine whether the contact information provided by the client 14, such as the domain name, is verifiable through the public registry or other means. If the information is verified by the system administrator, the system administrator will accept the order at block 130, and the account setup process will continue at block 138. If the information is not verifiable, the system administrator will reject the order at block 132. Thereafter, the system administrator accesses the SSL server to generate a message that is transmitted to the client 14 to notify the client 14 the order has been rejected and the reasons for the rejection, at block 134. The reasons can range from the domain name is not found or the information provided was not verifiable. Once the message notifying the client 14 that the order is rejected, the account information that was transferred by the SSL server 44 to the temporary database or processing queue of the database server 76 is deleted, at block 136.

Returning to block 120, if the information that was provided by the client 14 is verified, the account setup process commences. The account setup process begins with charging the costs associated with setting up an account to the credit card the client 14 provided. For instance, at block 138, the SSL server takes the credit card number, credit card name, expiration date and the like, and contacts a merchant gateway to connect the SSL server to the appropriate web server maintained by the credit card company for verification and authorization to charge a credit card account. The authorization gateway may be located at a separate server network for routing requests for authorization. Gateways of this type are generally understood by those of ordinary skill in the art and further description is unnecessary.

If authorization is granted, the credit card will be charged at block 140. If authorization is not granted or denied at block 144, the SSL server will generate a message that is transmitted to the client 14, at block 115. The message will notify the client 14 that the credit card number or other acceptable payment form is rejected, by displaying an appropriate message on the graphic interface of the client 14. After the message is transmitted, the verification process must start over at block 114 or 116.

After the information is verified, the communications program of the SSL server generates a command to transfer the contact information to the database server 76, at block 142. The database server 76 will store all of the contact information to create an account, such as account settings 66, account information 89, authentication information file 90, billing information file 92 and the appropriate task information file 107. The database server 76 will initiate the assignment program 98 to assign a customer ID and password that will be used by the client 14 for accessing services from the system 10, at block 146. Thereafter, the database server 76 assigns the client to one or more servers of group 40 at block 148, depending upon the type of services desired by the client 14. For example, the database server 76 may assign the client 14 to a mail server, a log server, an FTP server, a web server, and SSL server, a real server, a shell server and the like. Once the database server 76 has assigned the services requested by the client 14 to a particular server, the database server 76 will store the assignments in the designated assignment file 102. Thereafter, the database server 76 will generate a configuration file associated with each service that is requested by the client 14. The configuration file will contain the sequences and commands that will be used by the servers of group 40 to configure the predetermined system files 58, daemon 56 and configuration files of the operating system 54 to make the services available to the client 14 as desired. In addition, the database server 76 will create tasks 106 associated with each configuration. The tasks 106 will comprise a set of instructions, commands and sequences that are to be automatically executed by the server to obtain the configuration file and to modify any supporting operating system located on the server to setup and run the application software to deliver the services desired. The tasks 106 are stored in a task file 107 and mapped to the particular server that will be used to provide the service to the client 14.

After the database server 76 assigns the servers to the client 14, the database server 76 will generate the server information 104, which includes the list of servers to which the client is assigned, at block 150. Next, the database server 76 will format the account data 88 for display to the client 14 at block 152. The account data will be formatted according to defined protocols so that it may be displayed on the graphic interface of the client 14. After the account data 88 is formatted, the formatted account data is transmitted through the external communications channel 20 to the client 14. Preferably, the data will be emailed to the client 14 at block 154, for reference by the client 14 when logging in to access the services from the host 12.

Next, the database server 76 will establish a connection with the SSL server to transmit the server list so that the SSL server will have a list of each server of the server group 40 that will be required to deliver the services desired to the client 14. The SSL server then initializes the communications program to establish a connection to the designated port of each of the servers that are required to make the services available to the client 14. The connection is made by the SSL server in this example, by obtaining from the database server 76 the port number of each designated server that enables the server to establish communications from one of the servers in the group 40. Once the designated port is identified, the SSL server (i.e., the caller server) connects to that port through the internal switch 70 to establish a two-way communications link with the server, i.e., the receiver server.

After the connection has been established, the SSL server generates the instruction key 74. The key 74 will have a set of commands or instructions that will direct the receiver (i.e., the server receiving the call from the SSL server) to contact the database server 76 to determine what tasks have to be performed to setup the services on the server to the client 14. If the key 74 is rejected, such as block 158, the process of setting up the account services for the client 14 on that particular server is terminated at block 160. A key may be rejected if the server has reached its capacity, is not working or is in use. Preferably, the SSL server will receive state information from the database server 76 to determine the status of the server before an attempt is made to use the key 74.

If the key 74 is accepted, block 162, the SSL server will hang-up its connection with the receiver server by terminating the connection, block 164. The receiver server will store the key 74 in a temporary file and execute the instructions. The instructions are executed by the receiver server by establishing a connection with the database server 76 through the internal communications switch 70. The connection is made when the receiver server successfully initiates the communications program to direct the receiver to establish communication with the database server 76. Once the connection with the database server 76 is made, the database server 76 initiates its task manager to transmit the tasks 106 as to what system files, configuration files, code, and what daemons have to be configured to provide the services as requested by the client. Essentially, the receiver server will download the tasks 106 into a temporary file to be executed by the operating system of the receiver server to setup the services for the client 14.

After the tasks 106 are downloaded, the receiver server will hang-up its connection with the database server 76. Upon hanging up its connection, the operating system of the receiver server will execute the task 106 on the receiver server to automatically configure the daemon and associated predetermined system files and configuration files to provide the services as desired by the client. This step may include configuring as few as one or any number of daemons that may be necessary to setup the services according to the account data and settings specified by the client 14. After all of the tasks have been performed, that is, after all the files and application software have been configured, the receiver will establish a connection with the database server 76, block 170, to tell the database server 76 that it has completed all of the tasks and that the account is setup. The database server 76 will then modify the state information and tasks 106 to indicate that the account has been setup, block 174. Thereafter, the receive server hangs up by terminating its connection with the database server 76.

The step described with respect to blocks 162 to 174 are repeated for each server and each service that has to be setup or is contacted by the SSL server using the key 74. Therefore, it is contemplated that each server contacted by the SSL server will perform a similar task, block 176. After all of the servers contacted by the SSL server have completed the account setup process, the account is setup for the client 14, at block 180. The account is setup without the need for a system administrator to handle any portion of the account setup process, such as manually configuring the configuration files, application software, server daemons, system settings and the like.

It is contemplated that the steps 162 to 180 may be advantageously used to modify, add, change or re-configure the services that have been setup. The process of changing the account begins with the client 14 accessing the controller 108 at block 182. Access to the controller 108 is gained when the client enters the appropriate URL or IP address of the host company. The browser 36 will search the web for the IP address. Once the IP address is located, access to the web side or controller 108 is gained. As explained previously, the control panel is preferably written in HTML or display as a graphic interface for the client 14. The display will preferably include an icon for the file manger, email manager, FTP manager etc. that corresponds to the server or services that are available to the client.

Once the web site is located, the client 14 enters the Customer ID and password, block 184. The Customer ID and password as entered by the client 14 is transferred to the SSL server 44 for verification. The SSL server will initiate the verification program to authenticate the client 14. During the authentication process, the client Customer ID and password as entered are compared with the Customer ID and password assigned by the database server 76, block 186. That is, the SSL server will establish a connection with the database server 76 to obtain the Customer ID and password. If the comparison of the Customer ID and password obtained from the database server 76 and the Customer ID and password entered by the client 14 is favorable, access to the server network 16 is granted. If not, access to the server network 16 is denied, block 192. Thereafter, the client 14 is given the opportunity to reenter the Customer ID and password 191, which will initiate step 182 again. After one or more times unsuccessful attempts are made as determined by the programmer, the client 14 is disconnected.

To modify the account, such as creating an FTP username and password, the client 14 clicks an "add" button that is displayed as part of the graphic interface of the controller 108. The "add" button is a graphic display that is represented by a series of sequences and commands that are initiated using a point-and-click function. The add button is part of the tools 112 available to the client 14 to manage the account. Once the client 14 clicks on the "add" button, the controller 108 will do two chores. The controller 108 will first verify the information or account data that will be added, at block 190. The new account data to be added will be verified by the control manager reviewing the information that was added to determine if all of the appropriate information was entered that will be required to add the change. If the data to be added fails verification, an Error message is generated that is transmitted to the client 14, at block 192. The client 14 is given an opportunity to correct the errors.

If the information to be added is verified, the controller 108 will, as a second chore, contact the database server 76 and give the new user name and password. The database server 76 will then retrieve the server information to determine what servers should be contacted to make the changes to the account, block 194. The database server 76 will instruct the controller 108 to establish a connection with the FTP server 78. If, for example, other servers have to be contacted, each server will be individually contacted by the controller 108 through the SSL server using the key 74. The key 74 will instruct the receiver server to contact the database server 76 to find out what tasks or work has to be performed to reconfigure the application software, daemons, server files, and operating system to provide the service to the client as modified or added.

In the example with the new user name and password, the FTP server 46, if running, is contacted. The controller 108 sends the key 74 to the FTP server 46 to contact the database server 76 to modify the account. The key 74 is transmitted through the internal switch 70 and received by the designated port of the FTP server 46. After the FTP server receives the key 74, the FTP server will hang up the connection with the controller 108 and establish a communication with the database server 76 through the internal switch 70. After the database server 76 is contacted by the FTP server 46, the FTP server 46 will download the list of services from the server information file 104, as well as the account settings 66, the account data 88 and settings 96 that are used to provide the services to the client 14. The FTP server 46 will then check to see what tasks have to be preformed (i.e., what system files, configuration files, daemons and the like have to be modified), at block 196. Next, the task program will generate the specific task 106 that have to be performed to modify the FTP account as desired by the client 14. After the database server 76 identifies and generates the tasks 106, the tasks 106 are transmitted to the FTP server 46, at block 198. The FTP server 46 will then initiate its operating system to execute the tasks provided by the database server 76, by locating the specific predetermined files, daemons, and configuration files to insert, add, or configure the code, commands and sequences associated with the service so that the modified services can be added. That is, the FTP server 46, similar to all servers of the server group 40, have a daemon that is programmed to locate and modify the specific files (i.e, system files, server configuration files, and operating system files) as necessary to modify the services available to the client 14. Once the tasks are performed, the FTP server 46 will reestablish communications with the database server 76 to tell the database server 76 that it has completed the task, at block 200. The database server 76 will make a note of it in the account data 88, account information 89, account settings 66 and other files located therein, at block 202. For instance, the database server 76 may have to modify the account data, Customer ID, IP address and other information. Once the information has been stored, the database server 76 will disconnect from the FTP server. The account is then setup, block 204, and the new username and password is enabled. As such, the controller 108 of the system 10 provides flexibility to for the client 14 to manipulate the services to be provided.

The present invention described above, provides an automated method and system for configuring server daemons and sever operating systems. By programming the server (through the server daemons or other programs) to locate and edit specified predetermined files located on the server, such as 44, and connect to the database server to find out what task to do, the database server provides a useful tool to instruct the daemon what files to configure, codes to change and what files to setup to provide the services. Furthermore, the use of the database servers eliminates the need for the middleman, namely a system administrator, who would physically have to take the data and physically change the program of each sever to provide the services in the prior art.

However, with the present invention, a system administrator is not needed because the database server 76, having a list of services provided by each server and a list of what work has to be done to provide each service, can provide instructions or tasks that are performed by the server daemons to access services. Thus, the database server 76 can reduce the amount of work that a system administrator has to perform and, as a result, reduces the chance for human error in setting-up an account.

In addition, the architecture of the invention provides a means of maximizing the use of the servers to provide more efficiency. In particular, the use of the database server group can be used to fine-tune each server. The database server will retain the settings for the services running such that if a particular server goes down, the settings and services are not lost. Rather, another server may be added to the group 40 to provide the services such that there is no diminution of the performance or availability of services. The database server can instruct the client to use another server (say a second server for mail). Rather than reconfiguring the server itself, the daemon will simply contact the database server, and the client will not know that any service has been changed because the account data is not lost and is stored in the database group 42.

Furthermore, using the database group to manage the tasks to be performed by the servers maximizes the services to each client, per server. Each server that is providing a service is not weighed down with the storage of files to provide services. To build redundancy into the system, additional or a plurality of database servers may be used, each being a replica of the other. In that way, each server of the group 40 may be assigned to one or more database servers so that access to the data is not compromised when a number of users or clients access the system 10.

The system 10 also provides flexibility for a hosting company to provide services to the client 14 from the same source or a different source. That is, the servers 44, 46, 48 and 50 of group 40 may be provided each by a different hosting company. For example, if a particular company ("A") has a server that is particularly adept in providing end-users with email services over the Internet®, the server from company "A" may be linked to and be included as a discrete server of the group 40. If another hosting company ("B") has a server that is particularly adept in providing web space for web sites, the server from host company "B" may also be linked to and included as one of the discrete servers of the group 40. The use of different servers from different host companies has no limit, so long as each server is programmed to work within the system. In addition, the control manager or controller provides a useful tool for a hosting company to outsource the services that are provided to the client, to control the operation and function of each server. Accordingly, it is contemplated that at least one interactive server may be provided by a source or hosting company that is different that the hosing company that supplies one or the other interactive servers. It is also contemplated that at least one of the database servers may be provided by different sources or hosting company as well. Therefore, the group of database servers 42 and interactive servers 40 may be provided by the same source or hosting company, or any portion thereof (i.e., one or more of the servers of group 40 and 42) may be outsourced as well.

As such, it is contemplated that interactive servers and the database servers may be provided by the same or a different hosting company. Therefore, the system 10 provides flexibility in delivering or selling services to a client for use in providing other clients or end-users Internet® based services, by "outsourcing" the source of the services that are delivered to the client 14 through the server group 40 and database server group 42. It should be understood by those of ordinary skill in the art that the interactive servers and database servers should be configured to communicate with each other and the system 10 using a compatible communications protocol, TCP/IP or other desired protocol for exchanging information over a communications network, such as the Internet®.

Although the present invention has been described in detail in connection with the drawings, it should be understood that the drawings are for illustration only. The present invention may be implemented using different computer languages, platforms, networks, and structures in keeping with the spirit or essential attributes of the invention, as described in the appended claims. Therefore, reference to the appended claims should be made, rather than to the specification for indicating the scope of the invention.

I claim:

1. A system for automatically configuration a server daemon to provide a service to a client, the system comprising:

at least one interactive server, the at least one interactive server having a predetermined system configuration file and a server daemon, the predetermined system configuration file being used to make a service available to the client through the server daemon, a database server having a program to generate executable and transferable tasks that are used to configure the predetermined system configuration file to make the service available to the client as desired, an internal switch to enable the at least one interactive server to selectably communicate with the database server, an external communications network to enable the client to access the service available from the at least one interactive server, and whereby the at least one interactive server contacts the database server to obtain the tasks so that the predetermined configuration system file can be configured to make the service available to the client as desired.

2. The system as claimed in claim 1, further comprising a controller to enable the client to communicate with the at least one server to add, modify or change the service available to the client.

3. The system as claimed in claim 1, further comprising a plurality of discrete, interactive servers, each interactive server having a predetermined system configuration file and at least one server daemon to provide at least one service to the client, the at least one server daemon being programmed to locate and edit the predetermined system configuration file located on said interactive server.

4. The system as claimed in claim 3, further comprising a plurality of database servers, each database server having a task program to generate executable tasks that may be used by each predetermined system configuration file to make the at least one service available to the client.

5. The system as claimed in claim 4, wherein the client provides account information that is releasably retained by each database server.

6. The system as claimed in claim 5, wherein the database server generates the tasks relative to the account information.

7. The system as claimed in claim 6, wherein each of the interactive servers can selectably communicate and interact with each other and with at least one of the database servers.

8. The system as claimed in claim 7, wherein each interactive server may generate a transferable communications key, said key being used to instruct each interactive server receiving said key to contact at least one database server to obtain the tasks.

9. The system as claimed in claim 8, wherein each interactive server receiving said key contacts at least one database server to obtain the tasks so that the predetermined system configuration files may be configured to make the at least one service available from each interactive server to the client according to the account information.

10. A system for automatically configuring a server daemon in a client-server network for delivering a service to a client, the system comprising:

an interactive server having a server daemon for making a service available to a client and having a predetermined system configuration file, said server daemon being programmed to automatically locate and configure said predetermined system configuration file to make the service available to the client relative to account information associated with the client, an external database server to releasably retain the account information, said database server having a task program to generate executable and transferable tasks for use in configuring the predetermined system configuration files, said tasks being generated based upon the account information, a two-way communications network to enable said interactive server to selectably contact and interact with said database server to receive the tasks therefrom, an external communications switch to enable the client to communicate with the interactive server, and a controller to enable the client to selectably add, remove, or modify the service available from said server daemon, whereby, said database server transmits the tasks to said interactive server after being contacted by said interactive server, such that said server daemon will locate and configure said predetermined configuration files, as necessary, relative to the tasks in order to setup, add or modify the service available to the client.

11. The system as claimed in claim 10, wherein said interactive server further comprises a plurality of server daemons, each server daemon making a service available to the client.

12. The system as claimed in claim 10, wherein said interactive server further comprises a verification program to verify the identity of the client to the system when access to the service is demanded by the client.

13. The system as claimed in claim 10, wherein said database sever has an assignment program to assign a customer identification number to the client that is used to identify the client to the system.

14. The system as claimed in claim 10, further comprising a plurality of discrete interactive servers, each interactive server having a server daemon to make at least one service available to the client and having at least one predetermined system configuration file, wherein each server daemon is programmed to locate and edit the at least one predetermined system configuration file to make the at least one service available to the client.

15. The system as claimed in claim 14, wherein said interactive servers are each programmed to selectably contact and interact with one other and with said database server for setting up or modifying the at least one service available from each interactive server.

16. The system as claimed in claim 15, wherein said server daemon of each interactive server is selected from a group comprising a SSL daemon, a FTP daemon, a web daemon, a mail daemon, a shell daemon, a log daemon.

17. The system as claimed in claim 16, wherein the database server has an assignment program to assign the client to one or more of the interactive servers.

18. The system as claimed in claim 17, further comprising a plurality of external database servers, each database server releasably retaining account information associated with the client.

19. The system as claimed in claim 18, wherein each database server comprises a task program to generate executable and transferable tasks for use in configuring the at least one predetermined system file in each interactive server, said tasks being generated based upon the account information.

20. The system as claimed in claim 14, wherein each interactive server generates a transferable communications key to enable each interactive server to communicate with each other.

21. The system as claimed in claim 20, wherein each key provides instructions to direct the interactive server receiving the key to selectably contact the database server in order to receive the tasks.

22. The system as claimed in claim 21, wherein the server daemon running on each interactive server receiving the key sets-up or modifies the at least one predetermined system configuration file located in each interactive server in order to make the at least one service available to the client.

23. The system as claimed in claim 14, wherein at least one interactive server is provided by a hosting company that is different than the hosting company which provides at least one of the other interactive servers.

24. The system as claimed in claim 14, wherein each of the interactive servers are provided by the same hosting company.

25. The system as claimed in claim 18, wherein each of the database servers are provided by the same company.

26. The system as claimed in claim 18, wherein at least one database server is provided by a different database company than that which provides the at least one of the other database servers.

27. The system as claimed in claim 10, wherein the controller further comprises a management program for use by the client to manipulate the service available to the client from the interactive server.

28. The system as claimed in claim 27, wherein the controller controls the service available to the client from each interactive server.

29. The system as claimed in claim 10, wherein the controller has a controller server in communication with the interactive server, the controller server running a program to provide a graphic interface for the client to add, remove, or modify services available from the interactive server.

30. The system as claimed in claim 29, wherein the graphic interface comprises a plurality of tools selected from a group comprising a file manager, an email manger, a FTP manager.

31. A system for automatically configuring a server daemon and an operating system in a client-server network, the system comprising:
   a group of discrete interactive servers, each interactive having a server daemon and an operating system to make a service available to a client and having a predetermined system configuration file associated with the server daemon and operating system, the server daemon being programmed to locate and edit the predetermined system configuration file to make the service available to the client relative to account information associated with the client,
   a group of database servers for releasably retaining the account information, each database server having a task program to generate executable and transferable files of work to be performed by each interactive server that is used to make a service available to the client,
   an internal network to enable the group of interactive servers to selectably communicate with each other and with at least one of the database servers, and
   an external communications network to enable the client to communicate with the group of interactive servers to access the service available from each interactive sever,
   whereby, each database server transmits the tasks to the interactive server upon being contacted by each interactive server, such that the server daemon will locate and edit the predetermined configuration file for said interactive server based upon the tasks in order to setup or modify the service made available to the client.

32. A method for providing a client-server network to automatically configure a server to make a service available to a client, the method comprising the steps of:
   providing a discrete, interactive server having a server daemons to provide a service to the client and a predetermined system configuration file associated with an operating system stored in the interactive server, the daemon being programmed to locate and edit the predetermined system configuration file to make the service available to the client relative to account data associated with the client,
   providing an external database server capable being in communication with the interactive server to retrievably retain the account data, the database server having a task program to generate executable and transferable tasks that are used to configure the predetermined system configuration files to make the service available to the client,
   providing a communications means to enable the interactive server to selectably contact and interact with the database server to access the tasks,
   providing an external communications means to enable the client to interface with the interactive server, and
   providing a control means to enable the client to add, remove, or modify the service available from the interactive server, whereby that the interactive server selectably contacts the database server to receive the tasks so that the server daemon will locate and edit the predetermined system configuration file to make the service available to the client as desired.

33. A method for providing a client-server network to automatically configure system files for delivering network services from a host company to a client, the method comprising the steps of:
   providing a group of discrete, interactive servers for providing predetermined services to a client, each interactive server having application software programmed to locate and edit predetermined files used to make the services available to the client,
   providing a discrete, database server to support the group of servers, the database server being programmed to releasably store data associated with the services provided and having a program to instruct each interactive as to which services to setup,
   providing an internal, two-way communications link to enable each interactive server to selectably communicate with and interact with each other and the database server,
   providing an external communications link to enable the client to communicate with the system and access the services available from the group of interactive severs, and
   providing a controller to enable the client to add, remove, or modify the services desired from the system.

34. In a client-server network for automatically configuring system files to deliver services to a client, wherein the network has a group of interactive servers including a one or more discrete, interactive servers and an external database server in communication with each other through a private internal communications network, wherein each interactive server has a configuration file for delivering services to a client, wherein a method for automatically configuring the system files comprising the steps of:
   (a) programming a daemon running on each interactive server to locate and edit specific predetermined configuration files for use in making the services available to the client,
   (b) obtaining account data from the client associated with the services to be made available to the client,
   (c) transmitting the account data to the database server,
   (d) assigning the client to one or more of the interactive servers based upon the account data,
   (e) generating a list of tasks to be used by one or more of the interactive severs to setup, add, remove or modify the services to be made available to the client, and
   (f) contacting the database server to determine what tasks have to be performed by one or more of the interactive servers to setup, add, remove and modify the services to be made available to the client.

35. The method as claimed in claim 34, wherein step (f) is repeated by each interactive server that will be used to make the services available to the client.

36. The method as claimed in claim 35, wherein the daemon of each interactive server is programmed to locate and edit the predetermined system files based upon the tasks received from the database server.

37. The method as claimed in claim 36, further comprising the step of providing an external communications network to enable the client to provide the account data.

38. The method as claimed in claim 37, further comprising the step of assigning the client to one or more of the interactive servers that will be used to make the services available to the client.

39. The method as claimed in claim 38, further comprising the step of providing a key to enable each of the interactive servers to communicate with each other to instruct the interactive server receiving the key to contact the database server.

40. A system for automatically configuring a client-server network to provide a services to a client through a communications network comprising:

a plurality of discrete interactive servers, each interactive server programmed to setup an account to provide a service to the client and having a means to communicate with one or more of the other interactive servers, a plurality of database servers for retrievably storing account data associated with the services to be available to the client, each database server having a means for managing how the interactive servers setup the account, an internal communications network switch to enable each of the interactive servers to communicate with each other and with at least one of the database servers, an external communications link to enable the client to access the services to be made available from the interactive servers, and a controller to enable the client to identify the services to be made available as part of the account.

41. A client-server system for automatically configuring services desired by a client through a communications network, comprising:

a group of interactive servers for providing services to the client associated with an account, each interactive server programmed to setup, locate and edit predetermined system configuration files associated with an operating system stored within each interactive server for making services available to the client, a database server to releasably store data associated with the account, the database server having a task program for generating transferable tasks to be performed by each interactive servers to setup, add, remove or modify the services to be made available to the client by configuring the predetermined system configuration files, an internal network to enable each of the interactive servers to selectably communicate with each other and the database server, an external communications means to enable the client to access the account, and a control server to enable the client to interface with the interactive servers to setup, add, remove or modify the services to be made available as part of the account, whereby the tasks will be transferred by the group of database servers to the group of interactive servers when contacted by at least one of the group of interactive servers, so that the at least one server can configure the predetermined system configuration files located in the at least on interactive server relative to the tasks.

* * * * *